US006925257B2

(12) United States Patent
Yoo

(10) Patent No.: US 6,925,257 B2
(45) Date of Patent: Aug. 2, 2005

(54) ULTRA-LOW LATENCY MULTI-PROTOCOL OPTICAL ROUTERS FOR THE NEXT GENERATION INTERNET

(75) Inventor: Sung-Joo Yoo, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/261,816

(22) Filed: Sep. 30, 2002

(65) Prior Publication Data

US 2003/0030866 A1 Feb. 13, 2003

Related U.S. Application Data

(63) Continuation of application No. 09/654,384, filed on Sep. 1, 2000, now Pat. No. 6,519,062.
(60) Provisional application No. 60/185,640, filed on Feb. 29, 2000.

(51) Int. Cl.[7] .............................................. H04J 14/00
(52) U.S. Cl. ............................ 398/47; 398/45; 398/49; 398/51; 398/54; 398/57
(58) Field of Search ............................ 398/45, 49, 50, 398/54; 370/224–260

(56) References Cited

U.S. PATENT DOCUMENTS

| 4,797,879 | A | | 1/1989 | Habbab et al. ............... 385/24 |
|---|---|---|---|---|
| 4,831,616 | A | | 5/1989 | Huber ........................... 370/3 |
| 5,018,130 | A | * | 5/1991 | Suzuki et al. ................. 398/51 |
| 5,101,290 | A | | 3/1992 | Eng et al. .................... 359/123 |
| 5,337,185 | A | * | 8/1994 | Meier et al. ................. 359/321 |
| 5,488,501 | A | | 1/1996 | Barnsley ...................... 359/137 |
| 5,550,818 | A | | 8/1996 | Brackett et al. ............... 370/60 |
| 5,589,967 | A | | 12/1996 | Auffret ........................ 359/123 |
| 5,623,356 | A | | 4/1997 | Kaminow et al. ........... 359/123 |
| 5,706,375 | A | | 1/1998 | Mihailov et al. ............. 385/24 |

(Continued)

FOREIGN PATENT DOCUMENTS

| EP | 0702479 | 3/1996 |
|---|---|---|
| EP | 0949837 | 10/1999 |
| WO | WO 00/04667 | 7/1999 |
| WO | WO 00/04668 | 7/1999 |
| WO | WO 00/44118 | 1/2000 |
| WO | WO 01/35185 | 10/2000 |

OTHER PUBLICATIONS

Hunter et al., WASPNET: A Wavelength Switched Packet Network, IEEE Communications Magazine, Mar. 1999.*

(Continued)

Primary Examiner—M. R. Sedighian
(74) Attorney, Agent, or Firm—John P. O'Banion

(57) ABSTRACT

An ultra-low latency optical router with a peta-bit-per-second total aggregate switching bandwidth, that will scale to a total connectivity of 1000 by 1000, and beyond by modular upgrades, that utilizes advanced optical technologies to achieve such high capacity with two to three orders of magnitude less volume and power requirements than the electrical router counter part, that serves as a universal engine to other optical routers being developed by vendors and researchers today, that can function in the context of circuit-switching, flow-switching, burst-switching, and packet-switching, that uses advanced wavelength conversion technology to effectively achieve three methods of contention resolution in the router: deflection in wavelength, deflection in space, and buffering in time, and that interfaces a local network to the Supernet.

17 Claims, 24 Drawing Sheets

U.S. PATENT DOCUMENTS

| | | | |
|---|---|---|---|
| 5,734,486 A | | 3/1998 | Guillemot et al. .......... 359/139 |
| 5,745,612 A | * | 4/1998 | Wang et al. .................. 385/24 |
| 5,838,848 A | | 11/1998 | Laude .......................... 385/24 |
| 5,912,753 A | | 6/1999 | Cotter et al. ................ 359/137 |
| 5,920,663 A | | 7/1999 | Dragone ...................... 385/15 |
| 5,978,119 A | | 11/1999 | Giles et al. ................. 359/132 |
| 5,995,256 A | | 11/1999 | Fee ............................. 359/125 |
| 6,023,544 A | | 2/2000 | Dragone ...................... 385/37 |
| 6,108,113 A | | 8/2000 | Fee ............................. 359/124 |
| 6,111,673 A | | 8/2000 | Chang et al. ............... 359/123 |
| 6,160,651 A | | 12/2000 | Chang et al. ............... 359/124 |
| 6,219,161 B1 | | 4/2001 | Chang et al. ............... 359/124 |
| 6,233,075 B1 | | 5/2001 | Chang et al. ............... 359/124 |
| 6,271,946 B1 | * | 8/2001 | Chang et al. ................. 398/79 |
| 6,519,062 B1 | * | 2/2003 | Yoo ............................. 398/49 |

OTHER PUBLICATIONS

Wagner, Richard E. et al.; "Monet: Multiwavelength Optical Networking," Journal of Lightwave Technology, vol. 14. No. 6, pp. 1349–1355, Jun., 1996.

Kaminow, I.P. et al.; "A Widebadn All–Optical WDM Network," IEEE Journal on Selected Areas in Communications, vol. 14, No. 5, pp. 780–799, Jun., 1996.

Blumenthal, D.J. et al.; "WDM Optical IP Tag Switching With Packet–Rate Wavelength Conversion and Subcarrier Multiplexed Addressing," OFC 1999, Conference Digest, pp. 162–164, (1999).

Lee, J. et al.; "Secure Communication Using Chaos," Globecom 1995, pp. 1183–1187, Singapore, Nov. 14–16, 1995.

Cisco IOS Software, Tag Switching, Empowering the Era of the Internet and Intranets, available at the WWW site: http://www.cisco.com/warp/public/732/tag; pp. 1 thru 5.

Maxemchuk, N.F.; "The Manhjattan Street Nework," IEEE Globecom '85, pp. 255–261, Dec., 1985.

Chang, Gee–Kung et al.; "Multiwavelength Reconfigurable WDM/ATM/Sonet Network Testbed," Journal of Lightwave Technology, vol. 14, No. 6, pp. 1320–1340, Jun., 1999.

Budman, A. et al.; "Multigigabit Optical Packet Switch for Self–Routing Networks With Subcarrier Addressing," OFC '92, pp. 1 & 2.

Way, W.I. et al.; "A Self–Routing WDM High–Capacity Sonet Ring Network," IEEE Photonics Technology Letters, vol. 4, No. 4, pp. 402–404, Apr., 1992.

Hofmeister, R.T. et al.; "CORD: Optical Packet–Switched Network Testbed," Fiber and Integrated Optics, vol. 16, pp. 199–219, (1997).

Takada, K. et al.; "480–Channel 10GHz Spaced Multi/Demultiplexer," Electronics Letters, vol. 35, No. 22, Oct. 28, 1999.

Kato, K. et al.; "32–x–32–Full–Mesh (1024 Path) Wavelength–Routing WDM Network Based on Uniformloss Cyclic Frequency Arrayed–Waveguide Grating," Electronics Letters, vol. 36, No. 15, Jul. 20, 2000.

Guillemot, Christian; "Optical Packet Switching for WDM High Speed Backbones," Power Point Presentation at 24th European Conference on Optial Communication, Madrid, Spain, Sep. 20–24, 1998.

Gambini, Piero, et al.; "Transparent Optical Packet Switching: Newwork Architecture and Demonstrators in the Keops Project," IEEE Journal on Selected Areas in Communications, vol. 16, No. 7, Sep., 1998.

Hunter, David K.; "WASPNET: a Wavelength Switched Packet Network," IEEE Communications Magazine, pp. 120–129, Mar., 1999.

Bennett, Charles H. et al.; Experimental Quantum Cryptography, Journal of Cryptology, vol. 5, pp. 3–28, (1992).

Park, Eugene and Willner, Alan E.; "Self–Routing of Wavelength Packets Using an All–Optical Wavelength Shifter and QPSK Subcarrier Routing Control Headers," IEEE Photonics Technology Letters, vol. 8, No. 7, pp. 938–940, Jul., 1996.

Shell, M. et al.; "Experimental Demonstration of an All–Optical Routing Node for Multihop\Wavelength Routed Networks," IEEE Photonics Technology Letters, vol. 8, No. 10, pp. 1391–1393, Oct., 1996.

Wang, B.H. et al.; "Demonstration of Gigabit WDMA Networks Using Parallelly Processed Subcarrier Hopping Pilot–Tone Signaling Technique," IEEE Photonics Technology Letters, vol. 8, No. 7, pp. 933–934, Jul. 1996.

Shieh, W. et al.; "A Wavelength Routing Node Using Multifunctional Semiconductor Optical Amplifiers and Multiple–Pilot–Tone–Coded Subcarrier Control Headers," IEEE Photonics Technology Letters, vol. 9, No. 9, pp. 1268–1270, Sep., 1997.

Jiang, X. et a.; "All Optical Wavelength Independent Packet Header Replacement Using a Long CW Region Generated Directly Form the Packet Flag," IEEE Photonics Technology Letters, vol. 10, No. 11, pp. 1638–1640, Nov., 1998.

Faist, J. et al.; "High–Power Continuous–Wave Quantum Cascade Lasers," IEEE Journal of Quantum Electronics, vol. 34, No. 2, pp. 336–343, Feb., 1998.

Mason, B. et al.; "Widely Tunable Sampled Grating DBR Laser With Integrated Electroabsorption Modulator," IEEE Photonics Technology Letters, vol. 11, No. 6, pp. 638–640, Jun., 1999.

Shim, J. et al.; "Refractive Index and Loss Changes Produced by Current Injection in InGaAs(P) InGaAsP Multiple Quantum–Well (MQW) Waveguides," IEEE Journal on Selected Topics in Quantum Electronics, vol. 1, No. 2, pp. 408–415, Jun., 1995.

Chan, M. et al.; "The Effect of Carrier–Induced Change on the Optical Properties of AlGaAs–GaAs Intermixed Quantum–Wells," IEEE Journal on Selected Topics in Quantum Electronics, vol. 4, No. 4, pp. 685–694, Jul./Aug., 1998.

Neber, S. et al.; "Tunable Laser Diodes With Type II Superlattice in the Tuning Region," Semiconductor Science Technology, vol. 13, pp. 801–805, 1998.

* cited by examiner

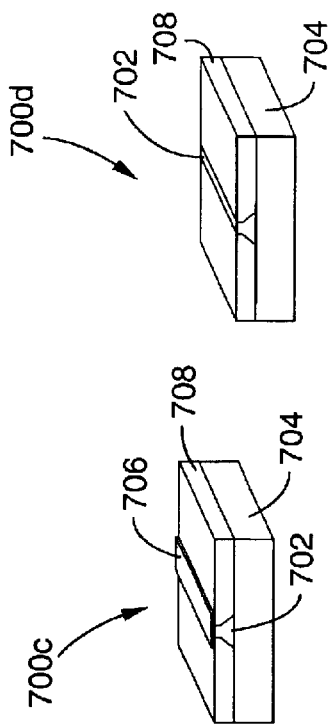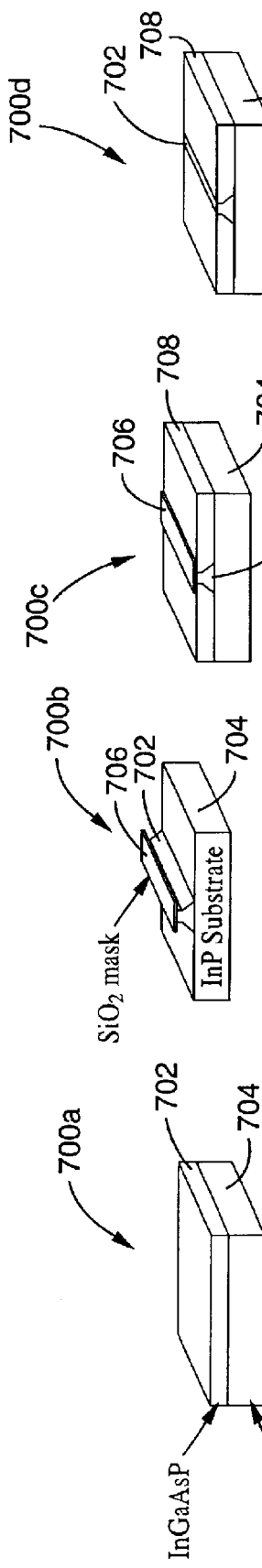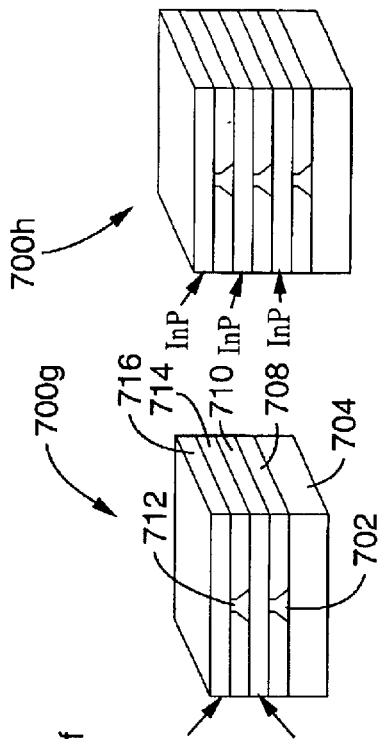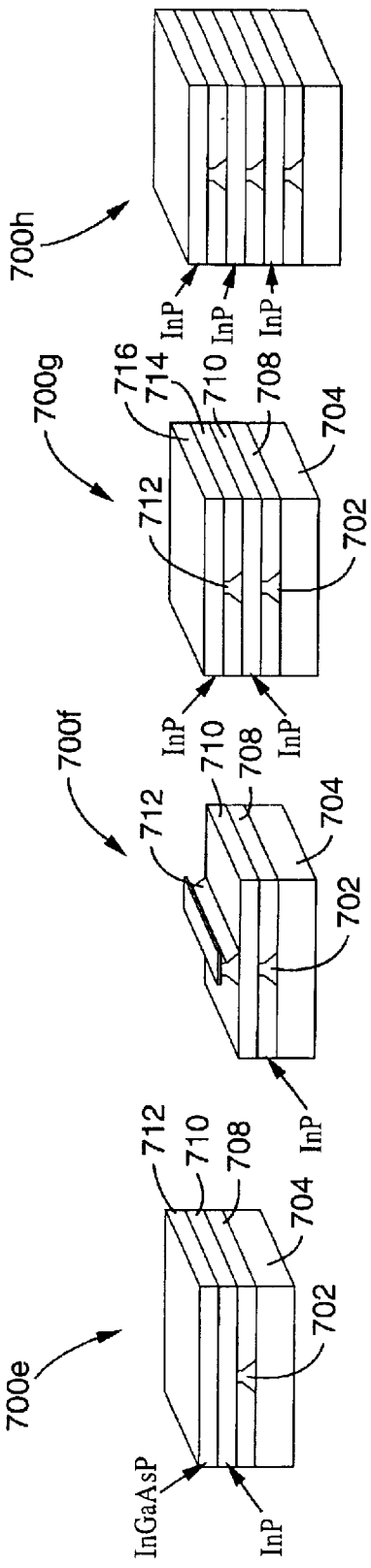

Recovered 155 Mb/s Header

Recovered 2.5 Gb/s Data

ULTRA-LOW LATENCY MULTI-PROTOCOL OPTICAL ROUTERS FOR THE NEXT GENERATION INTERNET

CROSS-REFERENCE TO RELATED APPLICATIONS

This application is a continuation of U.S. application Ser. No. 09/654,384 filed on Sep. 1, 2000, now U.S. Pat. No. 6,519,062, which claims priority from U.S. provisional application Ser. No. 60/185,640 filed on Feb. 29, 2000, incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to interconnected computer networks, and more particularly to an ultra-low latency, multi-protocol, optical router with a peta-bit per second total aggregate switching bandwidth.

2. Description of the Background Art

Telecommunications is currently undergoing a large-scale transformation. The explosive growth in the Internet, multimedia services, and computer communications is demanding a national network that can accommodate the entire amount of traffic in a cost effective manner. Advances in wavelength division multiplexing (WDM) technology have ushered in networks that are orders of magnitude higher in transmission bandwidth than existing networks. The "Next Generation Internet" (NGI) is expected to benefit from the high capacity and versatility of the multiwavelength optical networking technology. A number of commercial vendors have embarked on building next-generation core routers incorporating large scale electronic switch fabrics. While such routers demonstrate impressive aggregate switching capacities of terabits-per-second, however, it is evident that the power consumption and the physical size of these routers will limit scalability of the electronic routers much beyond the terabit regime.

FIG. 1 illustrates the typical switching architecture of the core in terabit routers currently being investigated by the industry. One of the key limiting factors in scaling these large electronic routers lies in power requirements. Due to the high-speed and high-connectivity requirements of such routers, they must employ optical interconnections between the transponders at the edges and the electronic switch fabric. The power requirements scale as $3aN+bN^2$ where N is the product of the total number of ports and wavelengths, a is the power dissipation per transponder, and b is the power dissipation per cross-point in the electronic switching fabric. This assumes a crossbar switch for the electronic switching fabric; however, the Banyan or Benes architecture will include a term which is approximately $(bN\log_2 N)$ instead of $(bN^2)$. Typical transponders dissipate typically 2.0 Watts for 2.5 Gb/s short reach, and higher for higher speed and longer reach transponders. Accordingly, the total power requirements for a terabit electronic router typically exceed 10 kW for a long reach (>50 km) and high bit rates (>2.5 Gb/s).

Therefore, there is a need for an ultra-low latency, multi-protocol, optical router with a peta-bit per second total aggregate switching bandwidth that is physically compact and has low power requirements. The present invention satisfies those needs, as well as others, and overcomes deficiencies in conventional router technology.

BRIEF SUMMARY OF THE INVENTION

In general terms, the present invention comprises a revolutionary ultra-low latency optical router with a peta-bit-per-second total aggregate switching bandwidth. Further, the optical router of the present invention will scale to a total connectivity of 1024 by 1024, and beyond this value by modular upgrades. The invention effectively utilizes advanced optical technologies to achieve such high capacity with two to three orders of magnitude less volume and power requirements than the electrical router counter part.

By way of example, and not of limitation, the core of the inventive optical router also serves as a universal engine to other optical routers being developed by vendors and researchers today. With proper attachment of middleware modules, the inventive optical router can function in the context of circuit-switching, flow-switching, burst-switching, and packet-switching. In particular, an optical-label (OL) switching implementation of the inventive optical router provides the most powerful interoperability with all of the aforementioned switching architectures including Just-in-Time (JIT) signaling.

The inventive switching architecture utilizes well-established arrayed waveguide grating routers with wavelength converters at the edges. There is no active component at the core, and the number of active components at the edges scales as 2N where N is a product of the total number of ports and the total number of wavelengths. Hence, the power dissipation scales as 2a'N where a' is the power dissipation of the optical wavelength converter to be discussed later. This is a significant improvement over electronic terabit switches which scale as $3aN+bN^2$, wherein a redundant number of transponders and transistors limit the scalability and performance due to power dissipation exceeding 10 kW for terabit routers.

The inventive optical router uses advanced wavelength conversion technology to effectively achieve three methods of contention resolution in the router: deflection in wavelength, deflection in space, and buffering in time. One or a combination of the three contention resolution schemes can be utilized in the optical router to achieve high throughput.

The optical router also interfaces the local network to the Supernet, and adaptive congestion management will be achieved by early detection of network conditions. Constant communications and signaling linking the Supernet and local area networks (LANs) will be available with the present invention. The end users will benefit from high-throughput and minimum delay of the network realized by the optical router. Support of priority based class-of-service (CoS) and on-demand quality of service (QoS) will provide users with flexible and cost-effective utilization of the available network capacity.

An object of the invention is to provide for ultra-low latency protocol independent packet routing.

Another object of the invention is to provide a scalable and power efficient router architecture.

Another object of the invention is to provide innovative optical switching technologies for contention resolution and header processing.

Another object of the invention is to provide for aggregation of fine grained traffic into the Supernet.

Another object of the invention is to provide for protocol independent routing and Interoperability.

Another object of the invention is to provide for end-to-end adaptive congestion management.

Another object of the invention is to provide an optical router capable of routing packets with ultra-low latency and high throughput.

Another object of the invention is to provide for innovative optical switching techniques to achieve packet forwarding at very high data rates.

Another object of the invention is to provide a scalable architecture for an optical router.

Another object of the invention is to provide an ultra-low latency, protocol-agile optical router that can potentially scale beyond 1024 by 1024 in connectivity and petabit per second switching capacity.

Another object of the invention is to achieve optical monitoring of traffic and signal degradation in the network.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 12A through FIG. 12H are flow diagrams showing a fabrication procedure for three-dimensional integration of arrayed wavelength gratings (AWGs) according to the present invention based on semiconductors.

DETAILED DESCRIPTION OF THE INVENTION

Referring more specifically to the drawings, for illustrative purposes the present invention is embodied in the apparatus, systems and methods generally shown in FIG. 2 through FIG. 22F. It will be appreciated that the apparatus and system may vary as to configuration and as to details of the components, and that the method may vary as to the specific steps and sequence, without departing from the basic concepts as disclosed herein.

1. General Router Architecture of the Present Invention.

Figure 2:
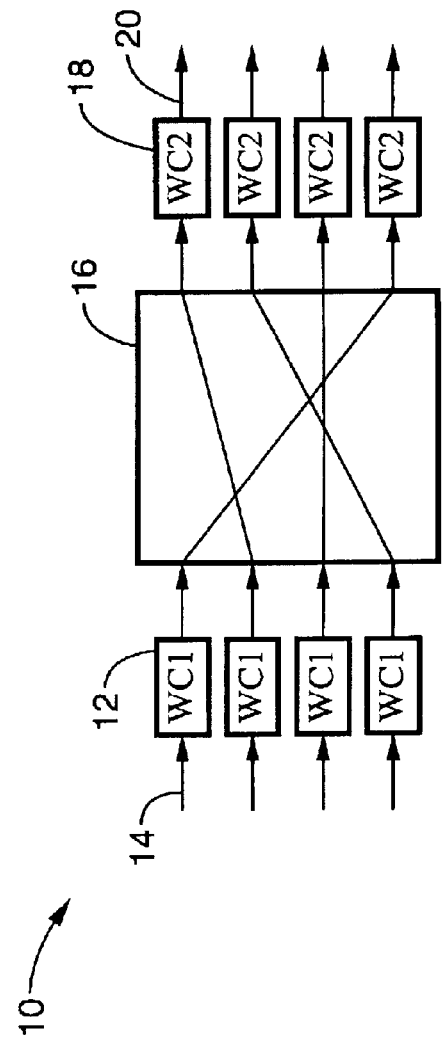
FIG. 2 is a schematic diagram showing the architecture of the core of an optical router according to the present invention.

Referring first to FIG. 2, an example of the switch fabric 10 of an optical router according to the present invention is shown. In the present invention, the switch fabric comprises a plurality of input optical wavelength converters 12 which direct optical signals 14 to an optical wavelength router 16, and a plurality of output optical wavelength converters 18 which produce output signals 20. Note that no physical space switches are employed; instead, switching is achieved by tunable wavelength conversion at the input optical wavelength converters 12.

As a result of this configuration, a number of advantages over conventional optical routers can be achieved. For example, the core of the switch fabric does not dissipate power. In addition, the power requirements scale as 2N, where N is the product of the total number of ports and wavelengths. By using conventional optical wavelength converters, each wavelength converter integrated with the diode laser will dissipate only approximately 0.3 Watts (e.g., 300 mA at 1 V) while at that same time be able to handle bit-rates exceeding 10 Gb/s. Therefore, the total power requirements for a terabit optical router are projected to be below 60 W, and a petabit router to be below 60 kW.

Figure 1:
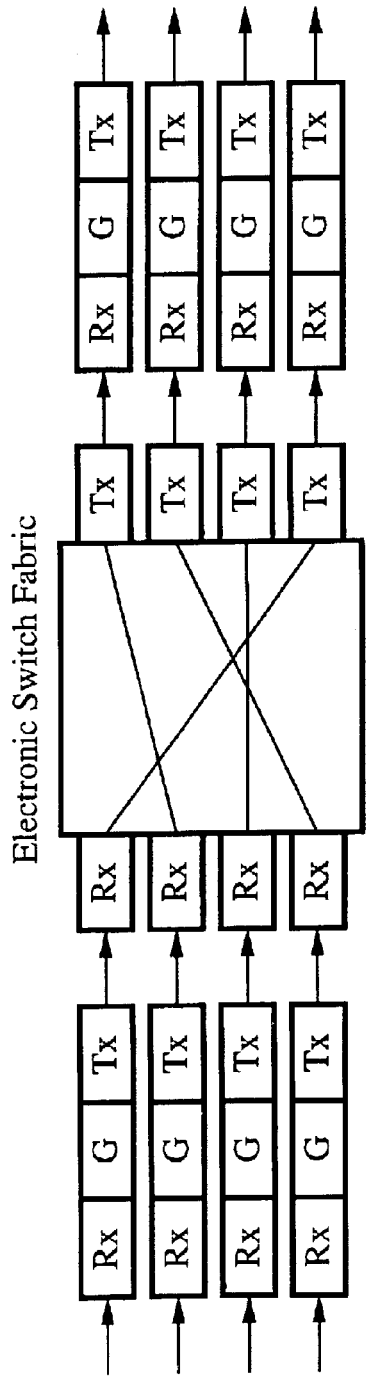
FIG. 1 is a schematic diagram showing the typical architecture of large electronic routers known in the art.
Figure 3:
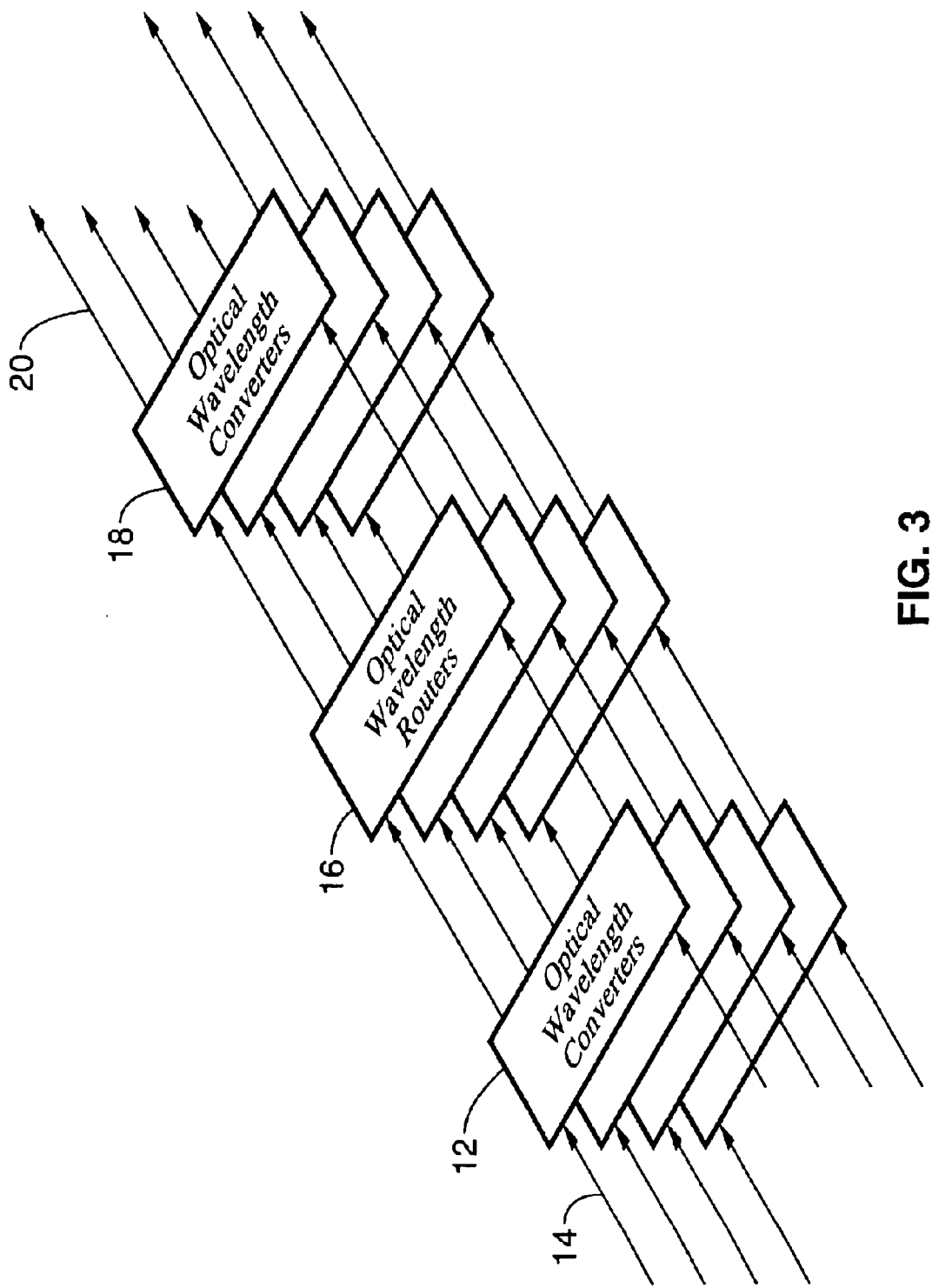
FIG. 3 is a schematic diagram showing an implementation of the optical router architecture of FIG. 2, employing a three-dimensionally packaged core switching fabric comprising optical wavelength converter arrays and optical wavelength grating router arrays.

In addition to having significantly lower power requirements than a conventional optical router, the physical space requirements of the optical switch fabric of the present invention are far less. It will be appreciated that size and packaging of components ultimately affect cost and maneuverability that are important for defense as well as civilian applications. The optical switch fabric of the present invention requires no high-speed electrical packaging, and the optical devices can be closely integrated without a concern for radio frequency (RF) crosstalk as is the case with an electronic switch fabric. On the other hand, each one of the typical transponders that would be employed in a router of the type shown in FIG. 1 would occupy a modular card or a RF-photonics package. As a result, a conventional terabit router will occupy many seventeen inch wide by six foot tall racks and demand significant cooling requirements. In contrast, the core of an optical router according to the present invention will occupy only about 10 in$^3$ if arrays of such wavelength converters and wavelength routers are integrated and packaged in three dimensions. In fact, the preferred embodiment of the switch fabric of the present invention includes wavelength grating routers that are integrated in three dimensions as shown in FIG. 3, and which will be discussed in more detail below.

Besides such clear advantages in power and physical size requirements of the switch fabric, an optical router according to the present invention benefits from additional capabilities in contention resolution. Conventional routers resolve contention by buffering in memory with occasional deflection routing. An optical router according to the present invention can seek contention resolution by one or a combination of three methods: deflection in wavelength, deflection in space, and buffering in time.

It will be appreciated that wavelength conversion is a powerful tool for optical routing since it accomplishes contention resolution without incurring additional latency or packet sequence skewing problems. Therefore, in the present invention, space switching is achieved by combining wavelength conversion with a dispersive element, preferably an arrayed wavelength grating (AWG), in the switch fabric. In the context of an optical router which also will be discussed herein, this wavelength conversion in the switching fabric provides a means to achieve path deflection and time buffering in the router. While the optical router of the present invention utilizes deflection in time, space, and wavelength for contention resolution, the switching in the three domains (time, space, and wavelength) is achieved by only wavelength conversion itself working with the unique architecture of the optical router of the invention.

In addition, scalable and large connectivities in the switching fabric can be achieved by tuning a single stage component, a tunable laser. This marks a keen contrast with conventional switch fabric architectures in which numerous switches are assembled and multiple of them have to be switched simultaneously.

Such clear advantages in optical routers have not yet been explored to date, primarily due to immature optical switching technologies. In particular, there is simply no space switching technology that combines the performance of rapid switching (e.g., <10 nsec), scalability (e.g., >100 by 100), and low crosstalk (<−20 dB). Wavelength conversion has also been a major hurdle, although newly developed techniques demonstrate excellent performance. Such wavelength converters have also shown a regeneration (2R— reamplification and reshaping) capability without any help of electronics.

In addition to wavelength converters, arrayed waveguide grating devices have shown wavelength routing capabilities with scalability beyond 128 by 128 and excellent systems performance. An optical router according to the present invention effectively achieves contention resolution by the combined operation of tunable wavelength converters and arrayed waveguide gratings which are packaged three-dimensionally as shown in FIG. 3.

2. Congestion Management Considerations in the Next Generation Internet

Figure 4:
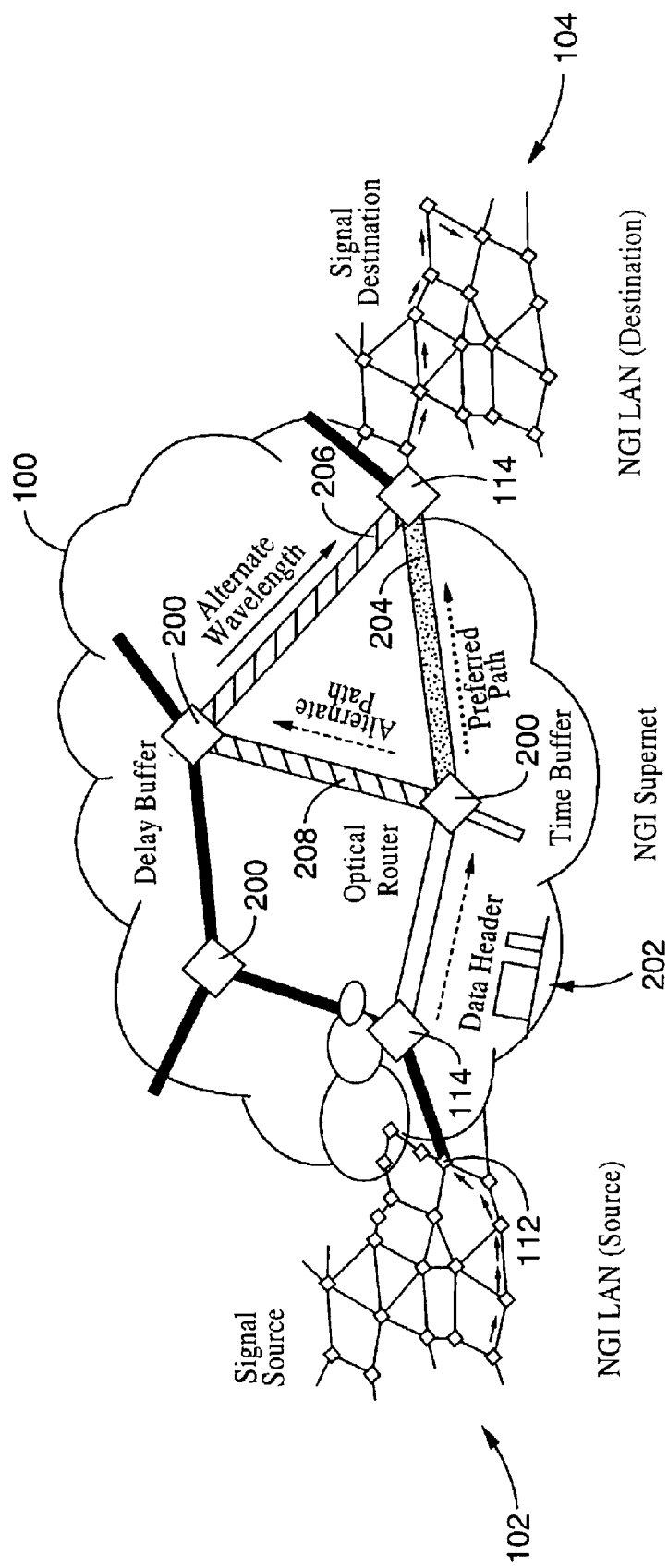
FIG. 4 is a schematic diagram showing an example of a packet transfer between a source NGI LAN to a destination NGI LAN via the NGI Supernet.
Figure 5:
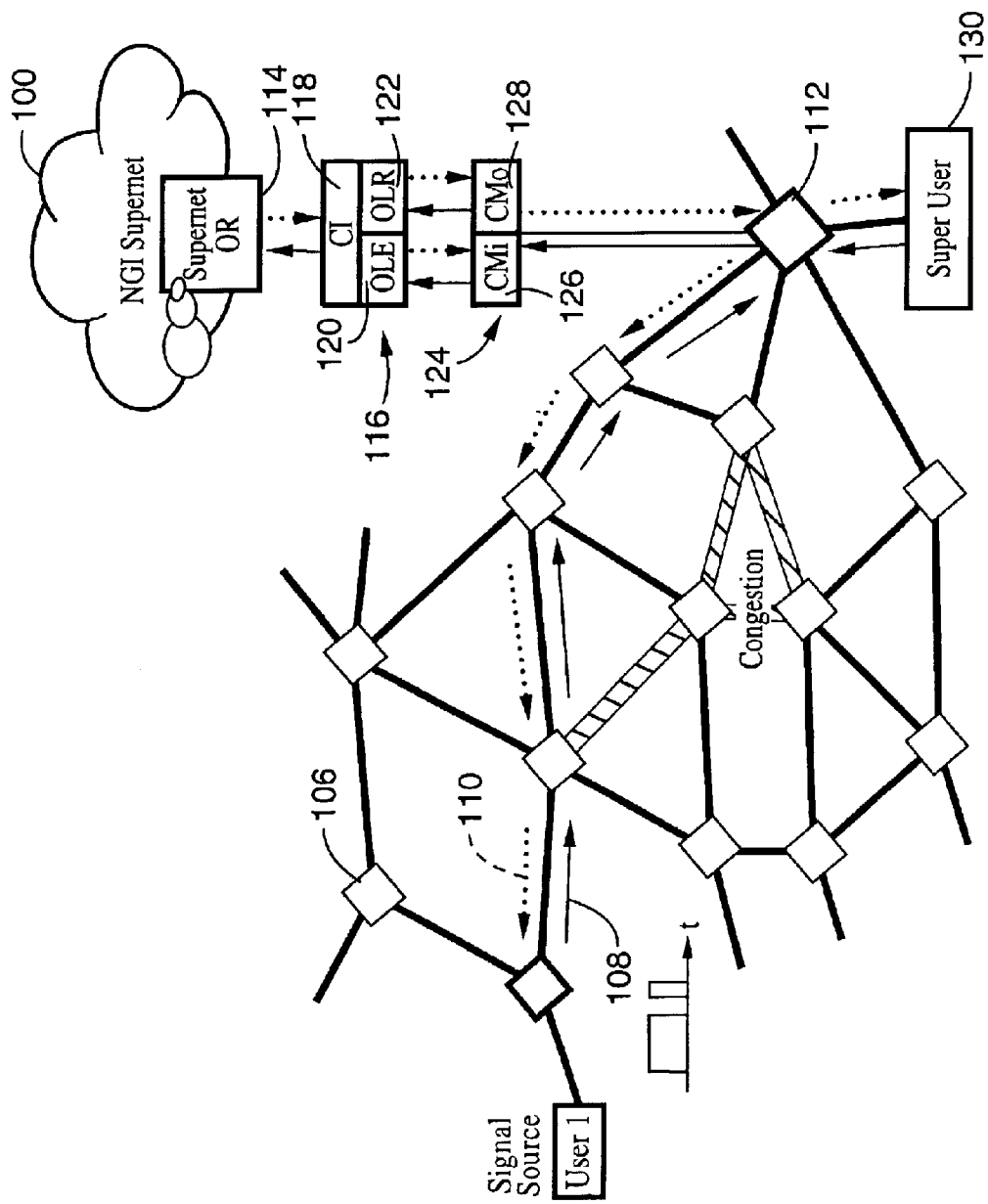
FIG. 5 is a schematic diagram showing an NGI LAN interfacing to the NGI Supernet by means of a label processing-client interface according to the present invention.
Figure 6:
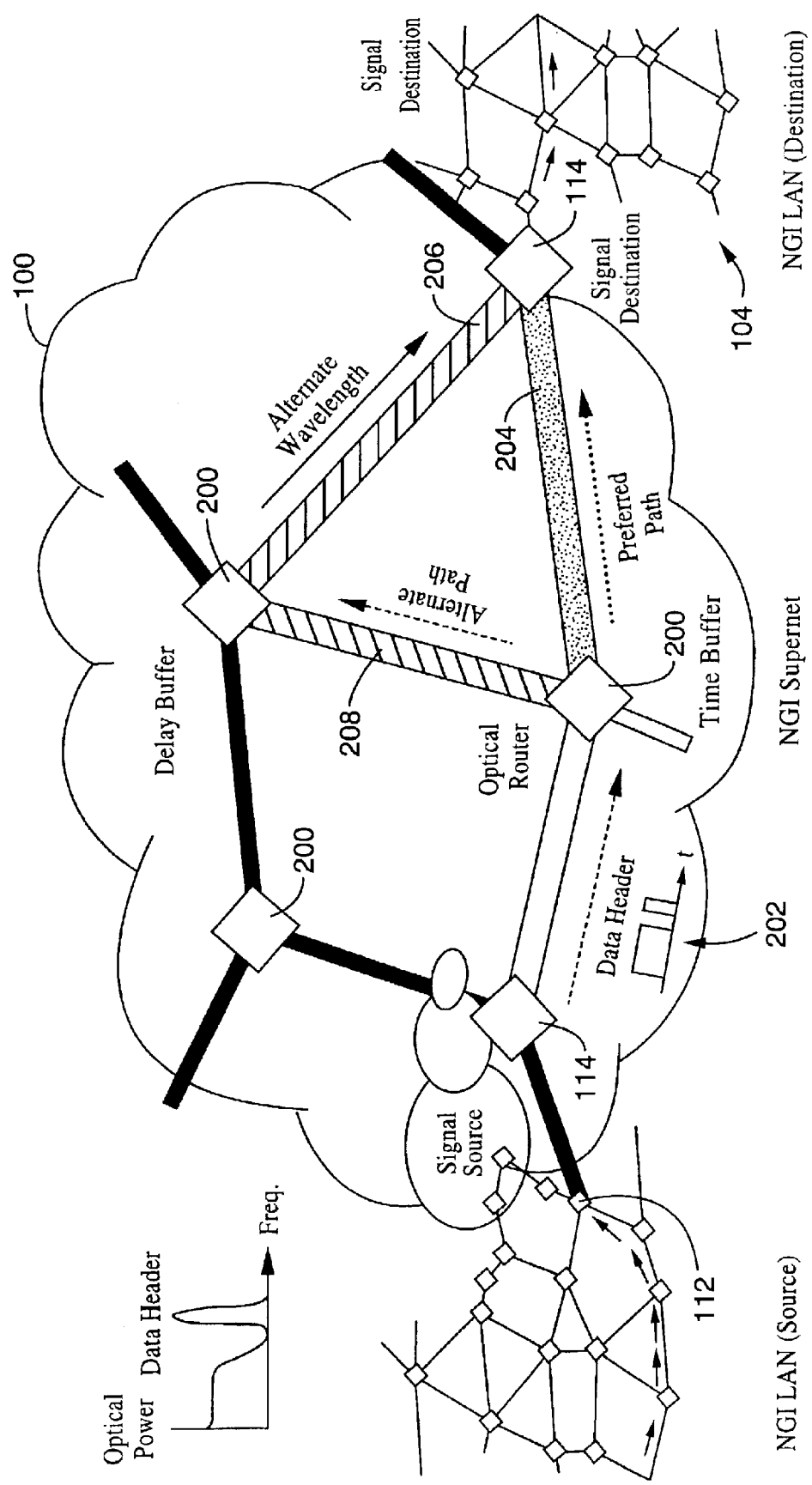
FIG. 6 is a schematic diagram showing routing over NGI Supernet using optical-label switching according to the present invention.

Referring now to FIG. 4 through FIG. 6, end-to-end performance of the "Next Generation Internet" (NGI) relies not only on the Supernet 100, which is the "Optical Internet", but also on the interconnected local area networks (LANs) or the conventional electronic Internet which handle fine-grained traffic. Therefore, two key issues must be considered. First, the network must employ an efficient end-to-end congestion management system which dynamically adapts to network conditions. Second, the traffic from the LAN must aggregate and merge into the Supernet with appropriate signaling to achieve end-to-end congestion management. In the past, congestion management schemes such as random early detection (RED) have been developed and implemented; however, their effectiveness is currently in debate. Adaptive congestion management methods that are effective and fair to all traffic patterns, including bursty traffic, must be adopted. Local area networks will continue to use electrical media for a foreseeable future because of their established low cost infrastructure. The interface between the LAN and the Supernet should provide low latency and high throughput regardless of the time and the location of the usage.

To meet this need, an optical router according to the present invention achieves end-to-end congestion management by a hierarchical combination of congestion management schemes in respective network domains. FIG. 4 and FIG. 5 are exemplary illustrations of the NGI Supernet and the NGI LAN interfaced by optical routers according to the present invention. FIG. 4 shows an example of a packet transfer from a source NGI LAN 102 to a destination NGI LAN 104 via the NGI Supernet 100. FIG. 5 shows a source NGI LAN 102 interfacing to the NGI Supernet 100 through a Supernet optical router (Supernet OR) 114, which is an optical router according to the present invention.

As shown in detail in FIG. 5, the LAN routers 106 (shown as small diamonds) continuously communicate with each other. This signaling allows not only a flow-control but also early detection of congestion or failures. Shown in solid arrows 108 are packet transports and broken arrows 110 are out-of-band signaling. The large diamond is an edge LAN router 112 with a bandwidth aggregation capability for interfacing with the optical router 114. To facilitate this client interface, a label processing-client interface (LP-CI) 116 is provided to add or remove the optical labels needed for routing packets in the NGI Supernet. LP-CI 116 comprises a client interface (CI) 118, an optical label encoder (OLE) 120 to encode an optical label, and an optical label remover (OLR) 122 to remove an optical label. In addition, a congestion manager 124 is provided, which comprises a congestion manager at input (CMi) 126 to achieve seamless congestion management at the input, and a congestion manager at output (CMo) 128 to achieve seamless congestion management at the output. Preferably, LP-CI 116 and congestion manager 124 are included as a part of optical router 114. Note that the edge LAN router 112 is also capable of routing the packets in and out of a Super User 130.

End-to-end congestion management is achieved by the congestion management systems within the NGI LAN as well as within the NGI Supernet. The NGI LAN can adopt any congestion management method that is deemed effective: RED, WRED, etc. Flow control based Media-Access-Control (MAC) is a norm for this method. LP-CI 116 is at the edge of source NGI-LAN 102 and has the capability to achieve MAC and congestion management within the NGI LAN. At the same time, the optical router of the present invention located in the NGI Supernet achieves congestion management within the NGI Supernet but in communication with respective NGI LANs.

In accordance with the present invention, congestion management in the Supernet is accomplished by load balancing achieved by contention resolution via deflection in the three domains (time, space, wavelength), as well as by updating of forwarding table in response to the current traffic conditions such as congestion in certain parts of the network, node failures, or link failures. Communication of congestion management information between an NGI LAN and the NGI Supernet is achieved through standard network control and management (NC&M) as well as LP-CI 116. Note that while the example of FIG. 4 and FIG. 5 shows only two layer hierarchical congestion management, the general concept is applicable to more complex congestion management across multi-domain networks.

The optical router of the present invention exploits advanced optical technologies. The optical router can scale and potentially achieve a petabit-per-second aggregate throughput with ultra-low latency on the order of ten nanoseconds. The invention lies in both network architecture and hardware architecture. The optical router can be utilized in various network environments. The forwarding decision in the inventive optical router relies on the optical-label, and the inventive optical router allows transport of data of any digital signal format and protocol so long as the optical label is intact.

In fact, the optical router of the present invention can interoperate with various traffic incorporating circuit switching, optical-MPLS (multi-protocol label switching), optical-label switching, label-burst switching, optical-flow switching, and optical-packet switching. Secondly, the inventive optical router architecture utilizes full, limited, or no wavelength conversion for contention resolution. Lastly, end-to-end congestion management is achieved by a hierarchical combination of congestion management in different network domains. The invention addresses shortcomings of today's practice and pursues two to three orders of magnitude improvement in throughput and scalability over electronic routers.

3. Underlying Network Architecture.

The core switching fabric of the inventive optical router can be used in any network architecture adopting any switching methods. As today's circuit-switched networks evolve towards packet-switched networks, it is important for a networking technology to interoperate with both of them in order to allow seamless network evolution.

Referring still to FIG. 4 and FIG. 5, the underlying network architecture assumes that a NGI LAN (or Electrical Internet) is linked to the NGI Supernet (or Backbone Optical Internet) through a client interface of one or more Supernet optical routers 114. In other words, the Supernet considers a LAN as its client. The LAN is assumed to be predominantly electrical due to its low cost. The interface between the LAN and the Supernet has two key important roles; namely, (i) aggregating fine-grained traffic and, (ii) achieving end-to-end congestion management.

The signaling between LAN routers will communicate the congestion states of each of its port (length of the queue) and early detection parameters. This communication will allow updating of a local forwarding table residing in each LAN router. In effect, this allows load-balancing and restoration of failures. It can also set up a circuit if demanded by the quality of service (QoS) parameter of the incoming packet. The default mode of operation will be a priority-based differentiated class-of-service (CoS) forwarding. An example of CoS supported services would be a "soft real-time" applications like internet protocol (IP) telephony or IP television (IPTV) conferencing in which queuing may prefer to drop some packets rather than to delay the transport. Another example of QoS supported services may be a real-time war theater or tele-surgery which require real-time interactive transport of high-resolution images may be required without packet losses.

The optical router of the present invention can be adopted in any network switching technologies. In the Supernet networking concept, the invention also provides an efficient and transparent packet routing method using an optical-label switching mechanism which can co-exist with legacy wavelength division multiplexing (WDM) technology on the same fiber.

Referring now to FIG. 6, which provides an enlarged view of the sample topology of Supernet 100 shown in FIG. 4, the underlying method for a fast connection setup using the optical signaling header for the companying data payload according to the invention is depicted. In FIG. 6, which shows an example of the NGI Supernet 100 accommodating optical-label switching according to the present invention, one or more WDM optical routers 200, each of which includes at least one label processing-transport interface (LP-TI) according to the invention, quickly read the data header part of the packet 202 and forward the packet. If there is switching contention on the preferred path 204, the optical router 200 will attempt to route the packet using an alternate wavelength 206, to delay the transport, or to route to an alternate path 208.

While the signaling due to the header is closely tied to the specific packet 202, thus achieving rapid routing of the packet based on the header content. Conventional packet-switched networks emphasized such "self-routing" that could rapidly route the packets based on the header contents. This method alone unfortunately lacks coordination between the nodes in order to achieve "network" level performance. Circuit-switched networks use NC&M to provision the connections that offered end-to-end QoS, however the connection setup typically took a long time (~1 sec) to complete. On the contrary, optical-label switched networks use NC&M and signaling architecture that resemble the human nerve system in which the brain (NC&M) and the reflex system (signaling) cooperate to achieve the optimum functionality. Signaling (reflex system) through optical-labels quickly makes a routing decision based on the header content and the routing table, and provides the statistics of packet transport (e.g. how long a packet of what priority is going from where to where through which port) for the NC&M (brain). On the other hand, the NC&M has its own capability to provision a circuit-switched service at much slower speed (~1 sec) than the packet routing performed by the optical-label-signaling (~100 nsec). The NC&M communicates with network elements through the data communications network (DCN) on a wavelength outside the WDM wavelength band utilized for packet transport. Through the DCN, NC&M monitors the network traffic conditions, updates the routing table to optimize the network performance, and even attempts to partially restore the fault in the network by correcting the routing table to route around the faulty nodes or links. The two-tier architecture of NC&M and signaling in the inventive optical router achieves rapid but coordinated forwarding of packets in light of the network conditions. From the viewpoint of today's circuit-switched network, upgrading the network to an optical-label switched network is graceful in that modular upgrades and interoperability are offered in this two-tier architecture. Hence the interoperability between circuit-switching and packet-switching is achieved in the optical-label switching network since the two-tier signaling architecture coexists in the network. NC&M is capable of provisioning a circuit-switched connection, where as optical-label attached within each packet allows rapid packet-switching. Circuit-switching can also be accomplished via the optical-label, by distributing the optical-label and by setting up a label-switched path during the provisioning phase. Further, a circuit can be set up for a very short time at the burst using the optical-label as a messenger to set up the short-lasting circuit, or burst-switching. Lastly, a stream of optical packets of the same optical-label content can set up a "flow-switching" of the train of the packets. The inventive optical router accommodates optical-label switching that can interoperate among circuit-switching, burst-switching, flow-switching, and packet-switching.

Figure 7:
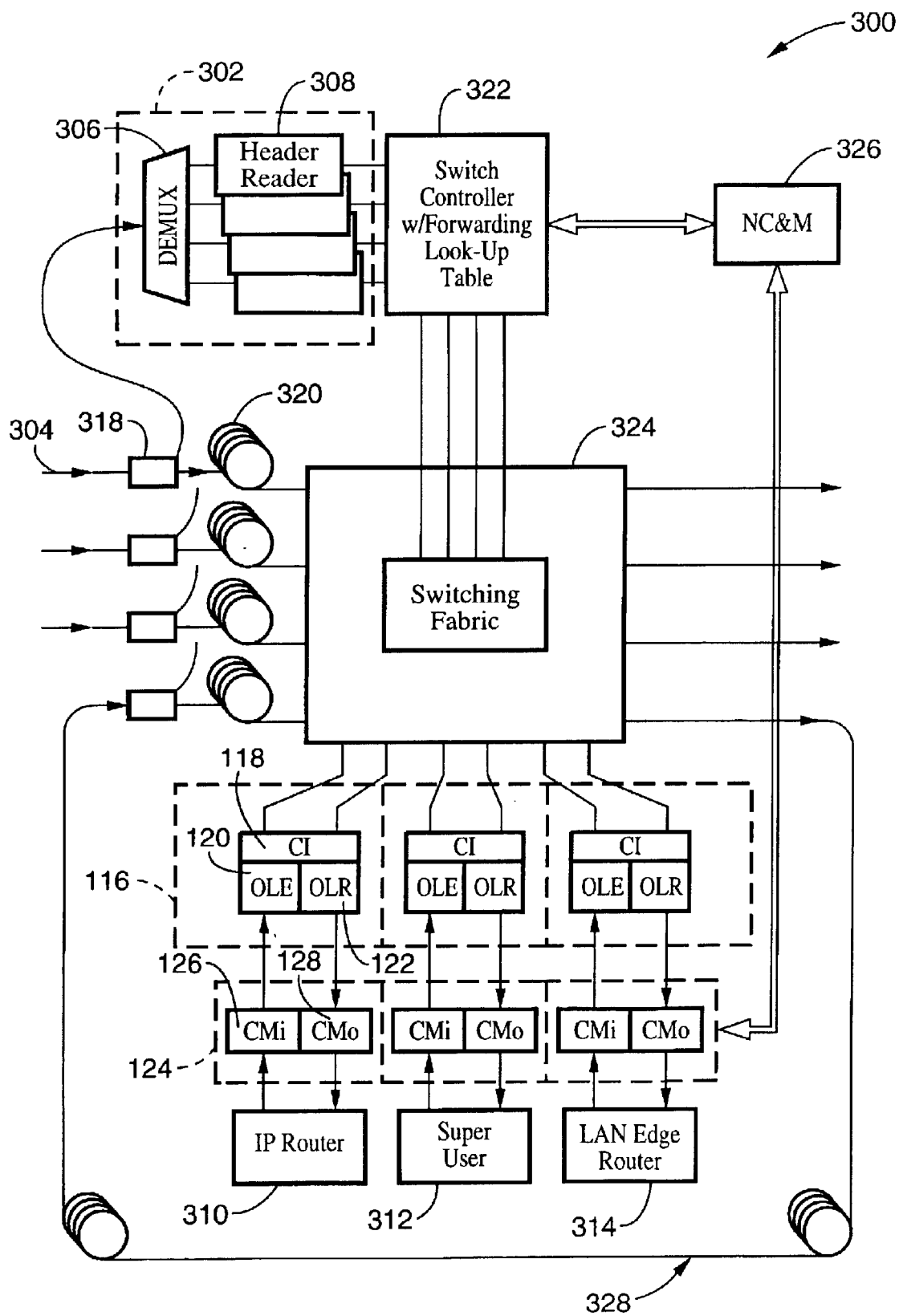
FIG. 7 is a schematic diagram showing an example of an optical router with label processing-client interfaces and label processing-transport interfaces to achieve optical-label switching for IP, ATM or client-specific traffic according to the present invention.

FIG. 7 illustrates an example of the architecture of an optical router 300 with optical-label switching capabilities according to the invention. This architecture of optical router 300 can include one or more LP-CI's 116 for positioning at a client interface as in the case of optical router 114 shown in FIG. 4 through FIG. 6, one or more label processing-transport interfaces (LP-TI's) 302 for positioning at a transport interface as in the case of optical routers 200 shown in FIG. 4 and FIG. 6, or both as shown. In other words, optical router 300 includes a plurality of label-processing modules as required to achieve optical label switching for IP, ATM or other client-specific traffic. In the example of FIG. 7, four such LP-TIs 302 would be provided, one of which is connected to each of the inputs 304, although fewer or greater than four inputs could be used depending on the number of input ports. In this example, each LP-TI 302 includes a wavelength demultiplexer 306 and header reader 308 to detect the signaling header for routing. Also in this example, three LP-CI's 116 and three congestion manager modules 124 are shown as well for interfacing with an IP router 310, a Super User 312 and an edge LAN router 314, although fewer or greater can be used depending on the number of clients.

Referring to FIG. 6 and FIG. 7 more specifically, an optical packet 202 (FIG. 6) entering one of the inputs 304 of optical router 300 will have its optical energy tapped off into two parts by an optical coupler 318. The smaller, preferably approximately 10%, part is sent to an LP-TI 302 and the larger, preferably approximately 90%, part is delayed by an optical fiber buffer 320. In the LP-TI, wavelength demultiplexer 306 separates the tapped optical packet depending on the wavelength of the optical packet and header reader 308 demodulates the header part of the optical packet. This demodulation will yield the bit information contained in the optical header, and the look up table 322 will compare this against the content of the table and decide on the signaling to the switch fabric 324. In the meanwhile, the larger part of the optical packet that has been delayed is ready to be forwarded by the switch fabric now set up according to the header content. Hence the delay time in the optical fiber buffer 320 should be sufficient to allow the header reading in 308, look-up table comparison in 322, and switching of the switch fabric 324.

In the example shown, LP-CIs 116 and congestion managers 124 allow for the interfacing of client machines 310, 312, 314 with optical router 300. CMi's 126 communicate with LP-CIs 116 and an external NC&M 326 to achieve input flow control, using media access control (MAC) or the like, between the external client machines 310, 312 and 314 and the optical router. Optical-labels are assigned to the packets or the circuit switched traffic at OLEs 120 and the traffic is passed to the switching fabric 324 through CIs 118. For traffic in the opposite direction, optical-labels are removed at OLRs 122. Similarly, CMos 128 communicate with LP-CI's 116 and NC&M 326 to achieve output flow control using media access control (MAC) between the client machines 310, 312 and 314 and the optical router. Since the optical router is part of the NGI Supernet 100 and the client machines are part of the source NGI LAN 102 and the destination NGI LAN 104, end-to-end congestion management is achieved by CMis 126 and CMos 128 as well as by congestion management in the NGI Supernet and in the NGI LAN. The inventive optical router also includes a time buffer, preferably in the form of optical random access memory (RAM). However, optical fiber delay line 328 is used since the optical RAM technology is not currently available.

More particularly, an optical router according to the present invention uses new signaling information that is added in the form of an optical signaling header which is carried within each wavelength in the multi-wavelength transport environment. The optical signaling header contains routing and control information such as the source, the destination, the priority, and the length of the packet. This header will propagate through the network along with the data payload. Each NGI optical router will sense this optical signaling header, look-up the forwarding table, and take necessary steps to forward the packet. During this processing and switching time, the packet (which contains both the header and the data) is delayed by the optical fiber loop at the transport-input interface before entering the switch fabric. The optical fiber loop length is chosen so that it would provide sufficient delay for the header processing and the switching at the optical router. The optical router itself provides the optical delay necessary for the short time required for processing the header and setting the switch states within each optical router. Hence, there is no need to manage the delay between the optical signaling header and the data payload. If the packet is to be routed to a wavelength/path where there is already another packet being routed, the optical router will seek routing by an alternate wavelength, by buffering, by an alternate path, or by a combination of the above.

It is important to note that instead of a "header", a "label" can also be used in the network. While the header contains information such as the source, the destination, the priority, and the length of the packet, the label contains information that has been agreed by the optical routers through a label distribution protocol. The header can be "deterministic" in the sense that the header content (the source, the destination, the priority, and the length of the packet) does not have to be altered throughout the lifetime of the packet. An exception is that there is a need for including "time-to-live" (TTL) which needs to decrement at each hop and the router must discard the packet when it reaches zero in order to avoid looping problems in the network. The two inventive methods to achieve the functionalities of "time-to-live" are described below. The label based forwarding generally adopts a label distribution protocol to set up label-switching paths and generally requires label-swapping, although "deterministic" labels can also be used. The inventive optical router is capable of "header" based routing as well as "label" based forwarding. Both types of packets appear physically identical, however, will be distinguished by a flag on the header or the label as shown on the packet 202 in FIG. 6.

As can be seen, therefore, the NGI optical routers are enhanced with two types of label-processing modules to efficiently handle bursty traffic. The first type of modules (LP-CIs) interface between the optical routers and the client machines (e.g. IP routers) to encode optical signaling headers onto the packets added into the network, and to remove optical signaling headers from the packets dropping out of the network. The second type of modules (LP-TIs) tap a small fraction of the optical signal from the input transport interfaces, detect signaling header information, and relay the appropriate commands to the switch fabric in the optical router after looking up the forwarding table. A fiber delay is placed at the input transport interface so that the packet including the header and the payload reaches the switch fabric after the switching occurs. This fiber delay will be specific to the delay associated with the combined time delay of header detection, table look-up, and switching. The targeted goal is to accomplish this in approximately 100 nsec with an approximately 20 m fiber delay.

Since there is no optical-to-electrical, electrical-to-optical conversion of the data payload at the optical routers of the present invention, the routings are completely transparent. Contrary to conventional IP routers which require multiple interfaces for multiple bit-rates or lower-level protocols, optical-label switching is transparent to bit-rates and low level protocols of data payload.

The inventive routing protocol will be adaptive and will perform the following functions: (a) measure network performance parameters (such as state of communication lines, packet loss rate, traffic, delays, capacity utilization, and signal degradations reflected in the form of header bit-errors), (b) report the measured information to the NC&M for forwarding computation, (c) compute forwarding tables at the NC&M, (d) disseminate the tables to each optical router in order to have packet routing decision at the optical routers, (e) gather traffic information from optical routers so that the NC&M will update the forwarding tables periodically, (f) forward a connection or routing request from a client machine to the NC&M, and (g) forward routing information from the NC&M to the optical router to be inputted in the optical signaling header. Note that the measurement in (a) can be done at the optical layer, simply by looking at the optical-label and communicating with the forwarding table. Since the optical header contains source, destination, size of the packet, type-of-service, etc, a collection of optical-headers can provide a good summary of traffic record through that measuring optical router. Likewise, the optical-label is also associated with information regarding end-to-end connection, and collection of optical-label information also provides similar traffic information. In addition, the forwarding table in the Optical Router will also provide how many packets have been lost, how much delay was imposed to the packet, and what wavelengths have been used with or without wavelength conversion. Such collection of all the traffic information is used not only to provide data for traffic monitoring in the NC&M, but also to achieve load-balancing or network restoration if there was congestion or failure in the node or the link. For instance, if there is a link failure, optical-labels will not be collected at the downstream node, and it will signal network restoration by informing the NC&M to recalculate the best routes and to update the forwarding tables of the optical routers in the network. As another example, if a traffic load on a particular wavelength of a particular port is measured to be very high at one of the optical routers, it will inform the NC&M, and it will alter the forwarding table of the upstream optical router to reduce the number of packets sent on that congested wavelength. As a final example, errors in the optical-label or optical-header bits will result in discarding of the associated optical packet, which will inform the NC&M. If there is an unusually high packet loss ratio, the NC&M will raise an alarming condition, update the forwarding tables in the optical routers in the network, and attempt to restore the network in a similar manner as described in the first example of link failure. This adaptive method is also a basis for "auto-discovery, auto-configuration, and auto-restoration" in that link or node failures and network performance degradation can be automatically detected, and network restoration can be attempted by updating the forwarding tables.

For the header based routing, this invention employs two different methods for incorporating the functionalities of "time-to-live". The first method comprises using an "expiration-time-stamp" in the header so that the packet can be discarded if the measured time at the node is beyond the expiration-time for the packet. The second method exploits "optical-TTL" by conducting error detection in the optical header. The header and the data payload will undergo identical paths, and their signal qualities will be highly correlated with each other. In other words, the packet can be considered out-dated if the signal-to-noise ratio of the optical label, and therefore that of the data payload has degraded significantly. A simple "checksum" operation on the optical label bits can yield inspection of the fidelity of the quality of the signal. Since conventional method of incorporating "time-to-live" requires swapping of labels at each router, the monitoring on the optical-label information provides an effective but simpler method for optical routers. Therefore, this can be considered "optical time-to-live" which requires no label-swapping operation.

The monitoring of the traffic condition is based on optical labels. The optical-labels contain information on source, destination, length, priority, and type of each packet. More importantly, the signal-to-noise ratio of the optical label is highly correlated with that of the data payload. Therefore, the network monitoring can be performed by monitoring the labels at each optical router. This optical-label monitoring provides information on billing and accounting, as well as the decision for "time-to-live" of the packet.

Priority based routing according to the present invention provides CoS. Higher priority packets are far less likely to be deflected in wavelength, in time, or in path than lower priority packets. The packet loss probability, latency, and bit-error-rate will also be significantly lower for the higher priority packets as they attempt to occupy the preferred wavelength/time/path. While this priority based routing would be sufficient for the vast majority of traffic, some traffic may still require a guaranteed QoS. In the inventive work we consider "on-demand QoS", where circuit-switched connections with QoS can be provisioned when requested. The combination of "CoS" and "on-demand QoS" provides the most versatile but yet very efficient utilization of the network capacity.

Intelligent Router Architecture

Switching Conflict Resolution in the Optical Router

In case of a switching conflict, the optical router can make one, or a combination of the following four choices of conflict resolution: wavelength conversion, time-buffering, path deflection, and prioritized packet preemption. Each method has advantages and disadvantages as described below:

1. Limited wavelength interchange (wavelength conversion), where a packet may be converted to an idle wavelength that would allow it to be forwarded onto the next hop. There is no need to provide choices of an entire wavelength set as an alternative especially when a large number of wavelengths (e.g., >64) are used; however, providing a limited number of, at least one, alternative wavelength can effectively resolve contention resulting in a significantly lower packet loss rate. The alternative wavelength routing also achieves the same propagation delay and number of hops as the optimal case, and eliminates the difficulties in sequencing multiple packets. From this perspective, wavelength conversion is a very attractive solution compared to path deflection or time-buffering.

2. Limited delay buffering (time-buffering), where a packet may be routed through a fiber delay line and recirculated back into an input port of the same optical router. At that point, the header content will be read and routing will be attempted again. One interesting point here is that, unlike in the conventional packet switching, no precise bit or packet synchronization is necessary for the buffer. For that reason, the choice of the length of the delay line can be arbitrary, however, there will be a trade-off between the amount of optical latency introduced due to the delay line versus the effectiveness of contention resolution. A limited number of delay buffer lines are incorporated in the optical router, and multiple wavelengths are accommodated in each delay buffer line. The general switch fabric discussed above includes wavelength conversion for the buffer so that packet wavelength can be converted to another wavelength if the buffer is occupied for the original wavelength. Looping within the switching fabric is avoided by incorporating an algorithm that eliminates the possibility of a loop-back within the switch fabric. The delay buffer using an optical fiber is only one example of many possible embodiments. Ideally, the optical router can incorporate an optical random access memory capable of storing any size of packet at any time and of recalling any one of the stored packets without disturbing the others. Such an optical equivalent of electronic random access memory does not exist today, hence the ideal embodiment of optical RAM based buffer must wait until the optical technology matures.

3. Limited deflection routing (path deflection), where a packet may be deflected to a neighboring switching node from which it can be forwarded towards its destination. Care again must be taken to prevent a packet from being repeatedly deflected, thereby causing signal degradation, as well as wasting network capacity. The "time-to-live" (TTL) and loop prevention schemes discussed above can be applied here.

4. Prioritized packet preemption, where a newly arrived packet may preempt a currently transmitting packet if the arriving packet has a higher priority. This would be the last resort solution when alternate wavelength, buffering, or path deflection routings are not available. Higher layer protocol such as transport control protocol (TCP) or NC&M can request retransmission of the packet if necessary.

Switching Fabric Architecture of the Optical Router

The core of the inventive optical router architecture can be adopted in any network architecture. Referring again to FIG. 7, the fundamental architecture of the optical router is based on the principle of the first three contention resolution methods discussed above. Note again that wavelength conversion is the most powerful contention resolution scheme avoiding the latency and the looping problem. Path-deflection and time-buffering is achieved by space switching within the switch fabric 324 of FIG. 7. However, current space-switching technologies fail to provide the system performance, the switching speed, and the scalability required by the future optical networking, especially in the Next Generation Internet. In particular, efficient packet switching relies on switching in less than ten nanoseconds. While such fast space-switches exist, the system performance of such switches in terms of cross-talk rejection and polarization sensitivities is not acceptable for optical networking. In accordance with the present invention, space switching is accomplished by means of wavelength conversion.

Figure 8:
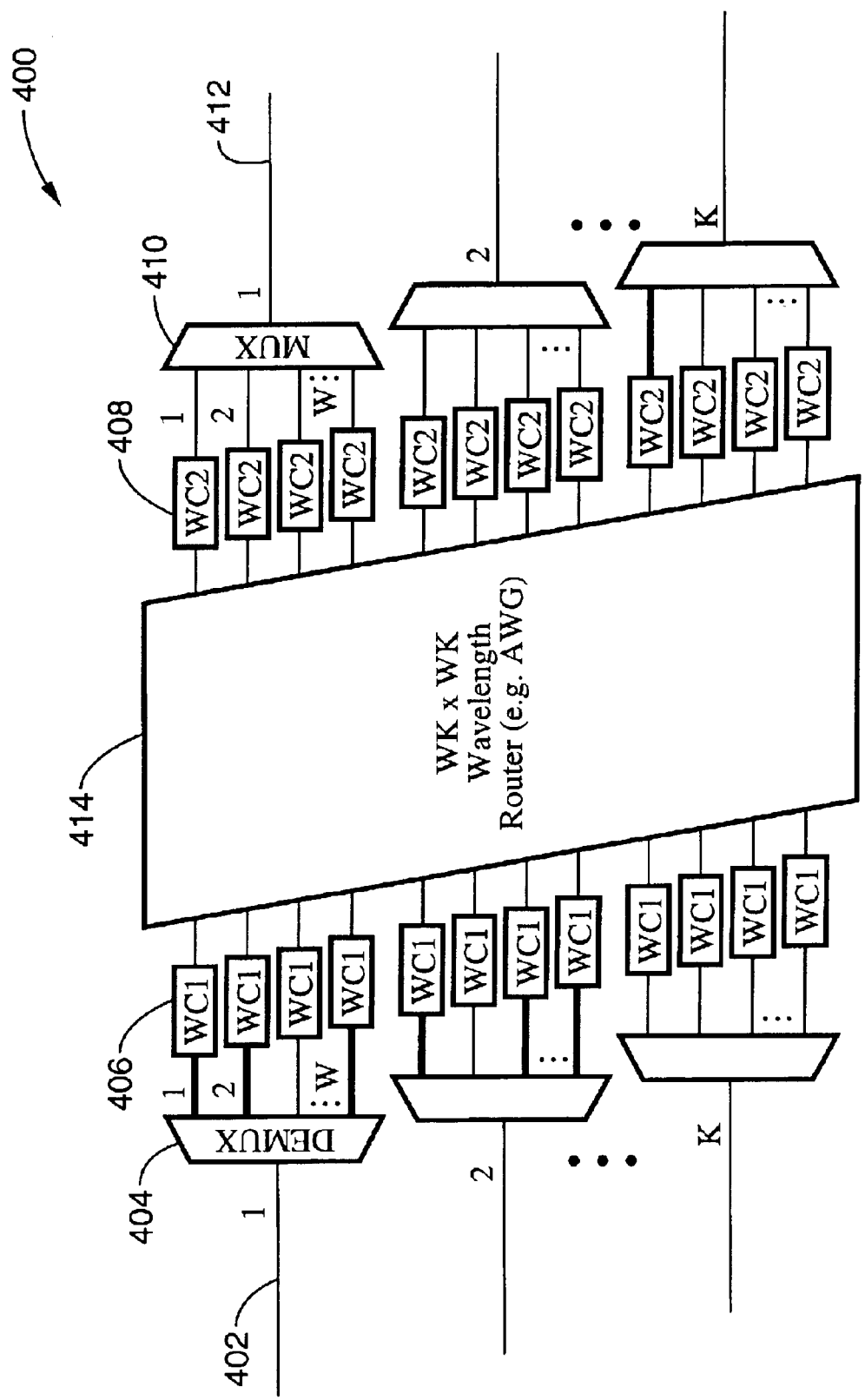
FIG. 8 is a schematic diagram of an embodiment of the switch fabric of an optical router according to the present invention with full degrees of wavelength conversion capability.

Referring now to FIG. 8, a first embodiment 400 of the switch fabric 324 in the optical router 300 of FIG. 7 is shown. As can be seen, the switch fabric has a number K of input ports 402, each feeding a demultiplexer 404 and a number W of input wavelength converters 406 for each input port. A corresponding number W of output wavelength converters 408, multiplexers 410 and output ports 412 are also shown. The first set of wavelength converters 406 depicted as WC1 will choose the wavelength that will route the signal to the appropriate output port of a wavelength router 414. The second stage wavelength converters 408 depicted as WC2 will convert this back to the desired wavelength for the network. In this first embodiment of switch fabric, any wavelength of any input port can be switched to any wavelength of any output port. At the heart of the switching fabric is wavelength router 414 based on an AWG which has the well-known wavelength dependent routing characteristics. Note that wavelength router 414 is to be distinguished from the optical router as heretofore discussed.

Figure 9:
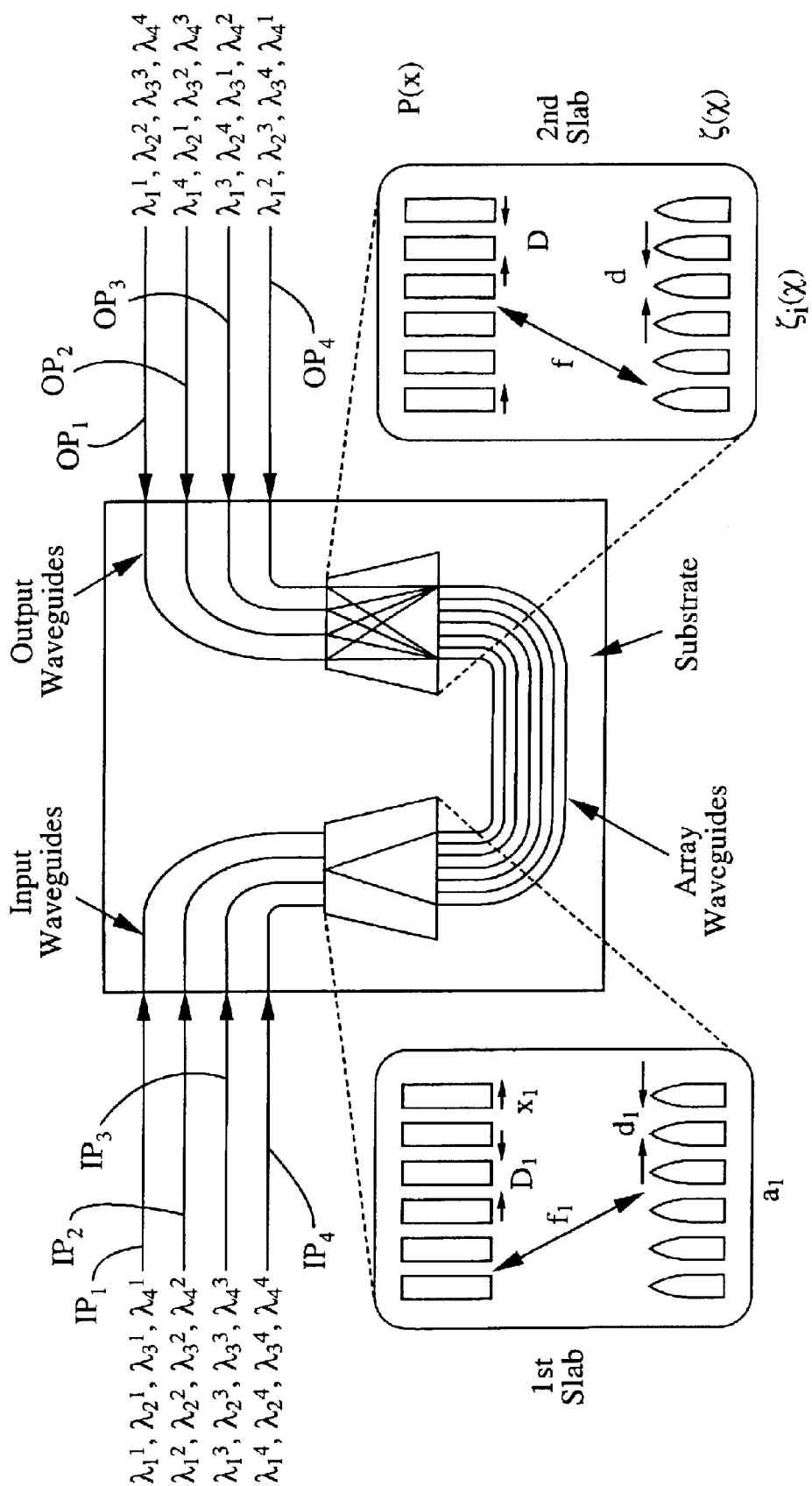
FIG. 9 is a schematic diagram of an example of an arrayed waveguide grating (AWG) to be used as part of the switch fabric in an optical router according to the present invention.

FIG. 9 illustrates the wavelength routing characteristics of wavelength router 414 schematically. The drawing is not shown to scale, as the array waveguides occupy the majority of the surface area, especially for dense WDM applications. Seen from the input port $IP_1$, an output port $OP_1$, $OP_2$, $OP_3$, or $OP_4$ can be chosen if input wavelength $\lambda_1$, $\lambda_2$, $\lambda_3$, or $\lambda_4$ is utilized, respectively. Hence, by choosing an appropriate input wavelength, routing to a desired output port can be achieved. In the switch fabric shown in FIG. 8, this corresponds to a tuning of the output wavelength of the first stage wavelength converter WC1 to an appropriate wavelength. The second stage wavelength converter WC2 is necessary for tuning this wavelength to the wavelength desired at the output of the switch fabric. This architecture is strictly nonblocking providing routing of any input wavelength of any input port to any output wavelength of any output port.

While the above optical router core architecture allows nonblocking routing, the scalability associated with this architecture is not trivial. First, the AWG has to have the size of WK by WK. Those skilled in the art will appreciate that 480-wavelength channel AWG multiplexers and demultiplexers, as well as 32×32 AWG routers with uniform loss characteristics, are known in the art. The AWG router can employ a very similar structure and identical technologies as the AWG multiplexer, but should be arranged in a more complicated configuration in order to achieve uniform loss over all wavelength channels. For example, for an ultimate router for an 8 port by 128 wavelength system, 1024×1024 AWG routers with uniform loss would be needed. Such increases in the number of ports increases the size of the AWG mainly due to reduced spacing between wavelength channels. In addition, the output of the wavelength converter needs to be able to tune and select 1024 individual wavelengths in the switching fabric. While it is conceivably possible to create a strictly non-blocking switching fabric capable of routing signals from any input wavelength of any input port to any output wavelength of any output port, it is technically challenging to fabricate such a large AWG and to achieve such a high-precision tunable wavelength converters Alternately, a case of limited wavelength conversion can be considered. A number of simulation studies have shown that limited wavelength conversion can reduce the blocking probability by a few orders of magnitude for a typical load in the network. For example, in a 128 wavelength system, a few choices of alternate wavelengths can be sufficiently effective in resolving contention as compared to the case where full 128 choices provide full degrees of contention resolution by wavelength conversion. Hence, an alternative architecture to what was presented in FIG. 8 can be considered.

Figure 10:
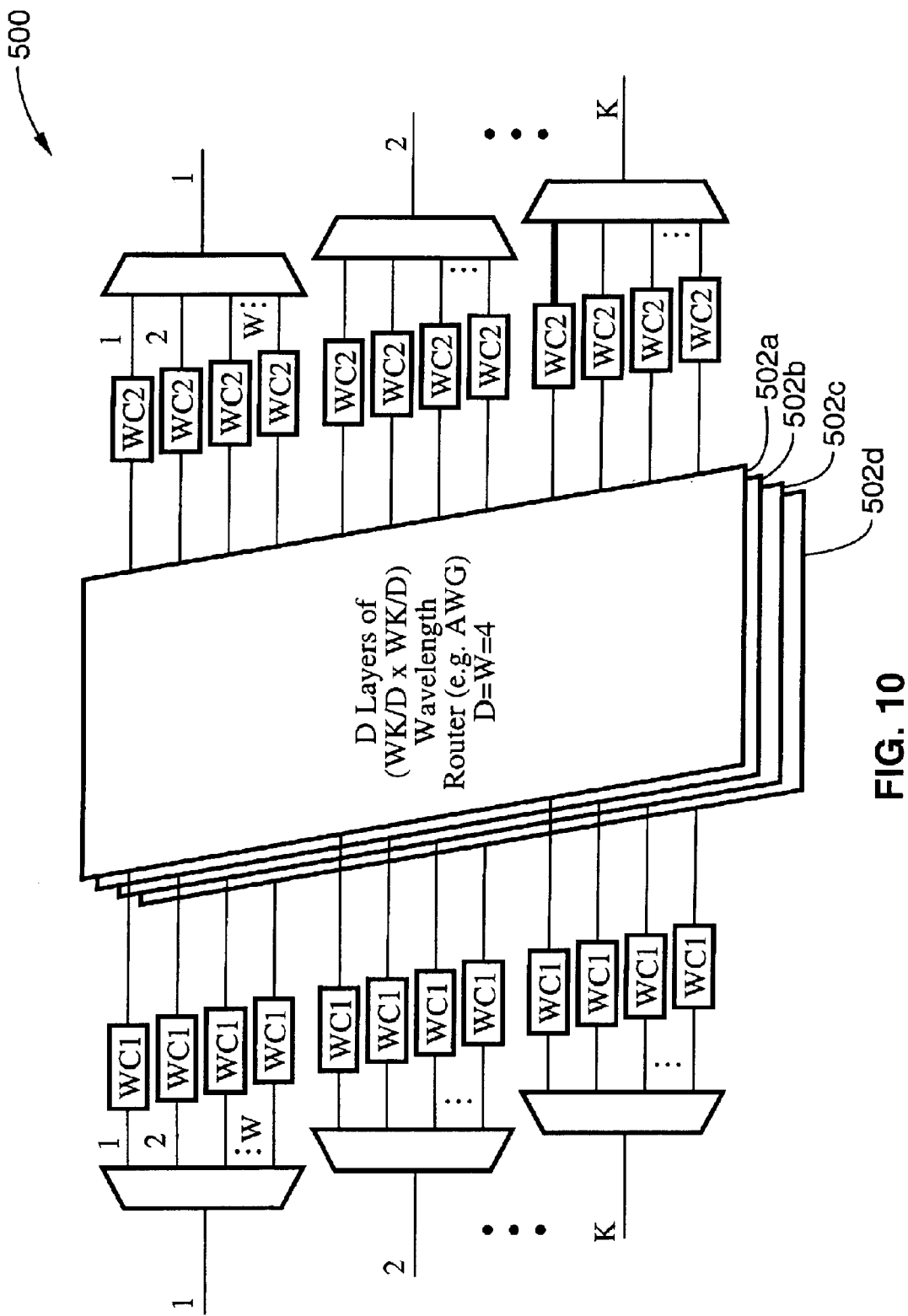
FIG. 10 is a schematic diagram of an embodiment of the switch fabric of an optical router according to the present invention with no wavelength conversion capability.

An alternative is to limit the choice of wavelength conversion to W/D where D is the degeneracy factor and W the total number of wavelength in a system. In an extreme degenerate case, D=W, and there will be only one choice (itself) of output wavelength per input wavelength. FIG. 10 shows such an extreme case. The embodiment 500 shown in FIG. 10 can switch any input port to any output port, but has no wavelength conversion capability. Wavelength 1 ($\lambda_i^i$) from any port i will be converted by WC1 to $\lambda_j$ in order to be routed to any output port j. WC2 will convert this wavelength back to wavelength 1, $\lambda_i$. As indicated previously, the other extreme is an AWG with full wavelength conversion as in FIG. 8, where D=1, and each input wavelength will have as many choices as there are output wavelengths.

When comparing FIG. 8 and FIG. 10, note that there is a significant amount of reduction in complexity in FIG. 10. The AWG in FIG. 8 employs a single layer WK×WK AWG, and the wavelength converters (WC1) must be capable of tuning WK distinct wavelengths. The AWG in FIG. 10 requires W layers of K×K AWGs and the wavelength converters must be capable of tuning K distinct wavelengths. Since AWG dimensions inversely scales as wavelength resolution, the AWG in the first will be larger than the latter by $W^2$. In the example of FIG. 10, four WK/4×WK/4 AWGs 502a through 502d are shown since there are four wavelength converters shown for each port.

Figure 11:
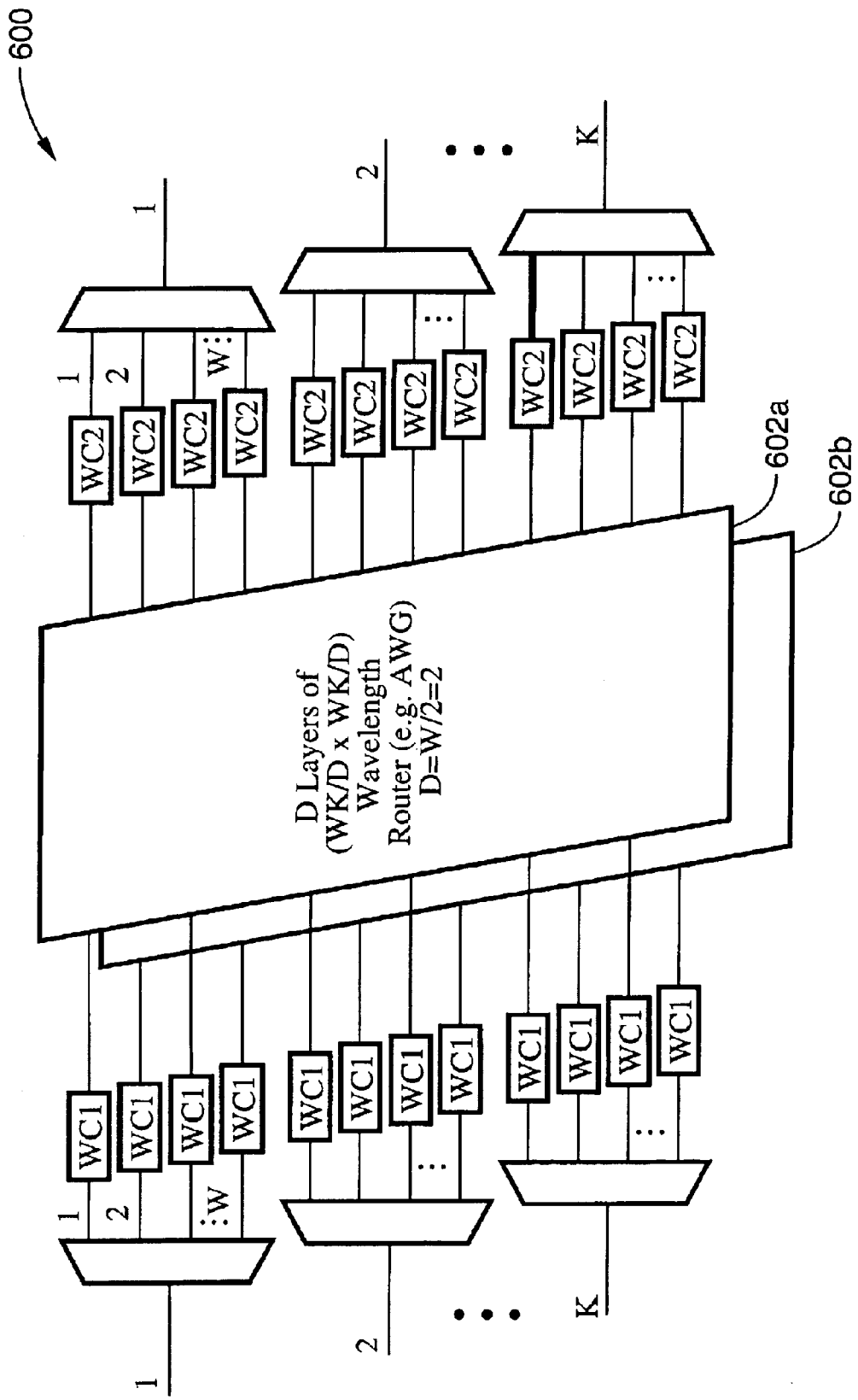
FIG. 11 is a schematic diagram of an embodiment of the switch fabric of an optical router according to the present invention incorporating two-fold degeneracy for limited wavelength conversion.

The preferred embodiment lies between the two extremes. For example, FIG. 11 shows an architecture incorporating limited wavelength conversion with a degeneracy factor of two. Since each of the two AWG layers 602a, 602b is a factor of four smaller than the AWG 414, this architecture is more compact than that shown in FIG. 8, but at the same time it provides higher degrees of wavelength conversion than that show in FIG. 10.

As can be seen, therefore, for a degeneracy factor of D, the switch fabric employs D layers of AWGs of size $\{(W/D) \times K\}$ by $\{(W/D) \times K\}$. As stated earlier, this reduces the size of the AWG area by a factor of $D^2$ compared to the area of the AWG of size (WK) by (WK). Note also that the switch fabric of FIG. 11 is strictly non-blocking for selecting space ports (achieves all K) but partially blocking for wavelengths (have W/D choices). For example, this would mean that for W=128 wavelengths, K=8 ports and D=8, each wavelength will have 16 choices of output wavelengths compared to the full 128 choices. However, each AWG will be smaller by a factor of 64 in area, and there would be 8 layers of the AWGs. Therefore, the total volume of AWG will reduce by a factor of 8 compared to the case of full wavelength conversion.

The example of FIG. 11 also shows that the input wavelength 1 of any input port has a choice of being routed to either wavelength 1 or 3 of any output port. Similarly, wavelength 2 of any input port can be routed to either wavelength 2 or 4 of any output port. We note that these choices are arbitrary and that they can be changed (shuffled) from a router to a router to achieve more effective contention resolution in the network which comprises of multiple routers.

As stated before, the switch fabric of the present invention is preferably included in the optical router architecture shown in FIG. 7. Thus the switch fabric exploits tunable wavelength conversion as the key switching mechanism for achieving contention resolution by one or a combination of deflection in wavelength, deflection in space, and buffering in time. As will be discussed in the next section, the tuning can be achieved within a nanosecond, which is sufficiently fast for optical packet switching.

It will be appreciated that the switch fabric of the present invention has the key advantage of providing scalability to very large switch fabric without requiring sophisticated AWGs. By employing interferomic wavelength converters capable of signal regeneration, the switching fabric can transport degraded signals and clean up the signals. In addition, the polarization state of the optical signal within the switch fabric can be chosen to be transverse electrical (TE) or transverse magnetic (TM) fields, so that the polarization dependency of the AWGs and the wavelength converters become relatively unimportant. Lastly, tuning and linewidth requirements on the tunable lasers, crosstalk and uniformity requirements on the AWGs become less important as the output stage of the wavelength converter defines the quality of the signal at the output of the optical router.

The above favorable functions contribute to the scalability of the switching fabric beyond 1024 by 1024 without requiring excessively sophisticated AWGs or tunable lasers.

There are a number of trade-off issues that need to be addressed in the architecture. The trade-off issues related to the "degree" of wavelength conversion which determines the trade-off between the packet loss rate and the complexity of the switch fabric have already been discussed. Another trade-off issue relates to optical-buffer vs. path deflection. In FIG. 7, a synchronous optical buffer in the form of an optical fiber has been utilized. Increases in the number of fibers will reduce the packet loss rate, however, will cause the switching fabric to grow in size. Alternately, path deflection will avoid the need for optical buffers, however will consume the network capacity and will potentially cause looping problem if not monitored carefully.

Optical Technologies

AWG

It can be seen, therefore, that the switch fabric of the optical router according to the present invention comprises arrayed wavelength gratings (AWGs) and wavelength converters (WCs). The scalability of the AWGs is determined by the crosstalk rejection requirement and the phase-error tolerance in the waveguides. As discussed earlier, the AWG performance requirements are far more relaxed in the inventive architecture than in the others since the wavelength converters perform 2R regeneration at the input and at the output of the optical router switching fabric. Therefore, the optical router can tolerate higher levels of crosstalk induced by such as phase errors and wavelength misalignment than the case where AWG is used without wavelength converters. Typical requirements on the AWG is to achieve better than 30 dB crosstalk rejection, however, the effectiveness of 2R regeneration of a single stage wavelength converter relaxes this requirement to 13 dB crosstalk rejection. The inventive architecture preferably utilizes two stages of wavelength converters per optical router, and the crosstalk rejection requirement for the AWG is expected to be below 13 dB. Since this requirement has been the main hurdle for scaling a manufacturable AWG to a size beyond 256 by 256, we expect that the relaxation in the crosstalk rejection requirement will allow higher yield and improved manufacturability for AWGs.

Fabrication of AWGs

EXAMPLE 1

Semiconductor, silica, and polymer based AWGs have been implemented to date. For InP based AWGs, the fabrication methods combine dry etching (e.g. reactive-ion-etching), wet chemical etching, and epitaxial regrowths (e.g. OMCVD). Rotation of the wafer during the epitaxial growths facilitates fabrication of uniform AWGs in order to reduce phase errors. In addition, it is possible to achieve three-dimensional integration of multiple of the inherently two-dimensional AWGs by adopting innovative lateral growth techniques offered by hydride vapor phase epitaxy (HVPE). This technique allows the first AWG to be fabricated and buried in an atomically planar surface. The second and subsequent AWG can be fabricated on the buried AWG.

FIG. 12A through FIG. 12H illustrate this fabrication procedure 700 of vertically integrating waveguide arrays. FIG. 12A illustrates the initial epitaxial growth of the InGaAsP waveguide core layer 702 on an InP substrate 704. FIG. 12B illustrates deposition of a $SiO_2$ layer by Plasma Enhanced Chemical Vapor Deposition (PECVD), photolithographically patterning the $SiO_2$ layer, and using the patterned $SiO_2$ mask 706 to dry etch by Reactive Ion Etching (RIE) and to follow up with an isotropic wet chemical etching. FIG. 12C illustrates planarization by Hydride Vapor Epitaxy (HVPE) growth of InP 708. FIG. 12D illustrates removal of the SiO2 mask by a wet etchant HF. FIG. 12E illustrates epitaxial growth of an InP layer 710 and another core layer of InGaAsP 712 in order to form a second waveguide on a completed buried-hetero waveguide. FIG. 12F illustrates repeating of fabrication steps in FIG. 12B on the second waveguide. FIG. 12G illustrates repeating of fabrication steps in FIG. 12C, FIG. 12D, HVPE growth of an InP layer 714 and an epitaxial growth of InP 716 to complete the second buried-hetero waveguide on top of the first. FIG. 12H shows repeating of the fabrication steps in FIG. 12E, FIG. 12F, and FIG. 12G to complete the third buried-hetero waveguide on top of the second and the first. By continuing to repeat the processes depicted in FIG. 12E through FIG. 12G for two dimensional arrays of AWGs, one can realize a very compact, three-dimensionally integrated AWGs.

Wavelength Converters

As can be seen thus far, wavelength converters reside at both input and output of the optical routers. Both stages of wavelength converters preferably will employ Mach-Zehnder (MZ) interferomic wavelength converters. The 2R regeneration capabilities of MZ wavelength converters have been widely observed, although the input power has to match the optimum point for the MZ wavelength converters to benefit from the regeneration capability. Such regulating of the input power level can be accomplished by incorporating a saturated amplifier such as an erbium doped fiber amplifier (EDFA) or a semiconductor optical amplifier (SOA).

Figures 13, 14:
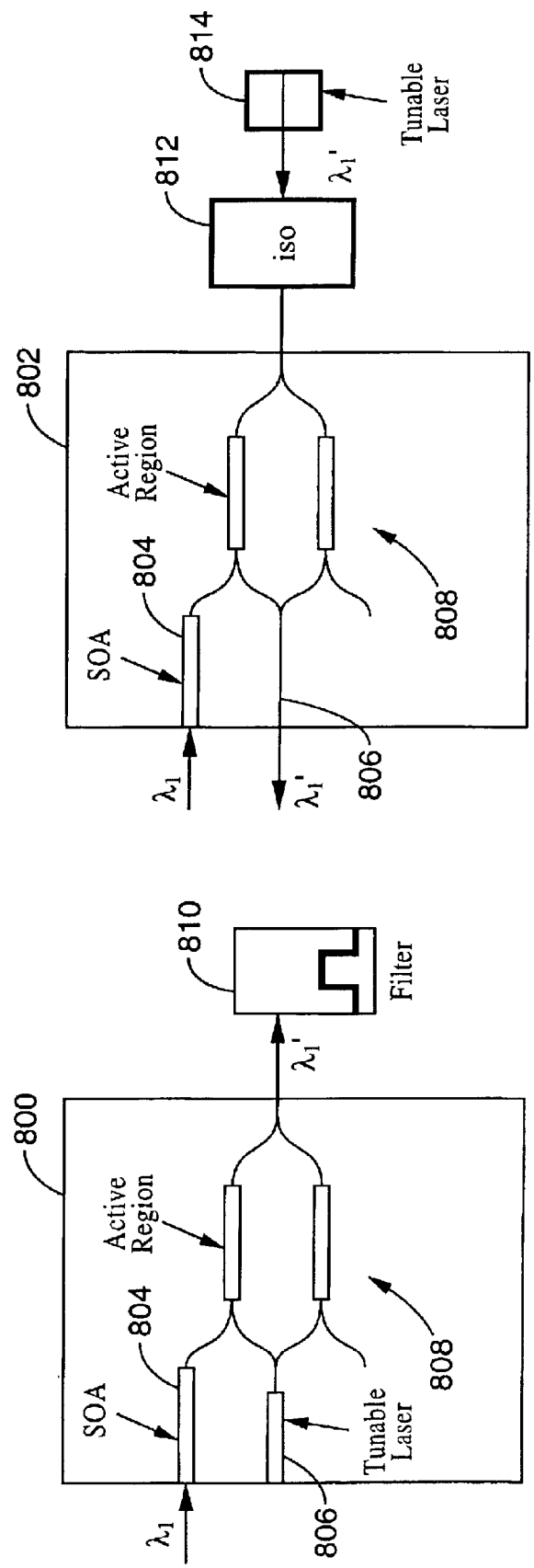
FIG. 13 is a schematic diagram showing a modified Mach-Zehnder wavelength converter for use in connection with an optical router according to the present invention where a co-propagating scheme is employed.
FIG. 14 is a schematic diagram showing a modified Mach-Zehnder wavelength converter for use in connection with an optical router according to the present invention where a counter-propagating scheme is employed.

FIG. 13 and FIG. 14 show two schematics of the wavelength converters 800, 802 with a SOA 804 at the input port. The co-propagating scheme in FIG. 13 allows integration of the tunable laser 806 with the Mach-Zehnder (MZ) wavelength converter 808, but requires a wavelength filter 810 to block the input wavelength and to pass the probe wavelength from the tunable laser. Therefore, this scheme does not allow wavelength conversion to itself ($\lambda_k$ to $\lambda_k$). The counter-propagating scheme in FIG. 14 eliminates the need for a filter and allows conversion of a wavelength to itself. However, it requires an isolator 812 and thus integration with the tunable laser 814 is extremely difficult. The architecture of the switching fabric discussed herein indicates that the incapability of converting a wavelength to itself may cause a problem of not being able to route the packet to a desired port if the wavelength converter is used at the input stage (WC1). This is also a problem for the output stage (WC2) since it cannot accept a signal from a particular WC1. Hence, the counter propagating method shown in FIG. 14 is preferred for both WC1 and WC2.

It will be appreciated that the active region of the MZ wavelength converter typically comprises a SOA in which carrier density reduction at the presence of light induces a phase shift. Accordingly, it may be desirable to utilize a weakly absorbing (e.g., approximately 10%) region reverse-biased to its avalanche regime. Avalanche photomultiplication in this region will amplify the photocarriers generated due to a weak absorption. By utilizing a bandtail absorption under a strong inverse bias, we can achieve a uniform and weak absorption over the wide spectrum (e.g., approximately 20 nm). The SOA at the input facet will maintain the input signal power at 30 mW or above, and the probe beam from the tunable laser will be at about a 1 mW level. Using the gain-bandwidth product of 200 GHz for the InGaAs material in the avalanche region, the preliminary design shows that 5 Gb/s operation is possible with the current design with input signal power 30 mW. Higher bit rate operation is possible by raising the input signal power. The main advantage of utilizing the avalanche multiplication instead of the SOA lies in potentially lower noise operation and a significant reduction (e.g., approximately a factor of 3) in driving current requirements.

Figure 15:
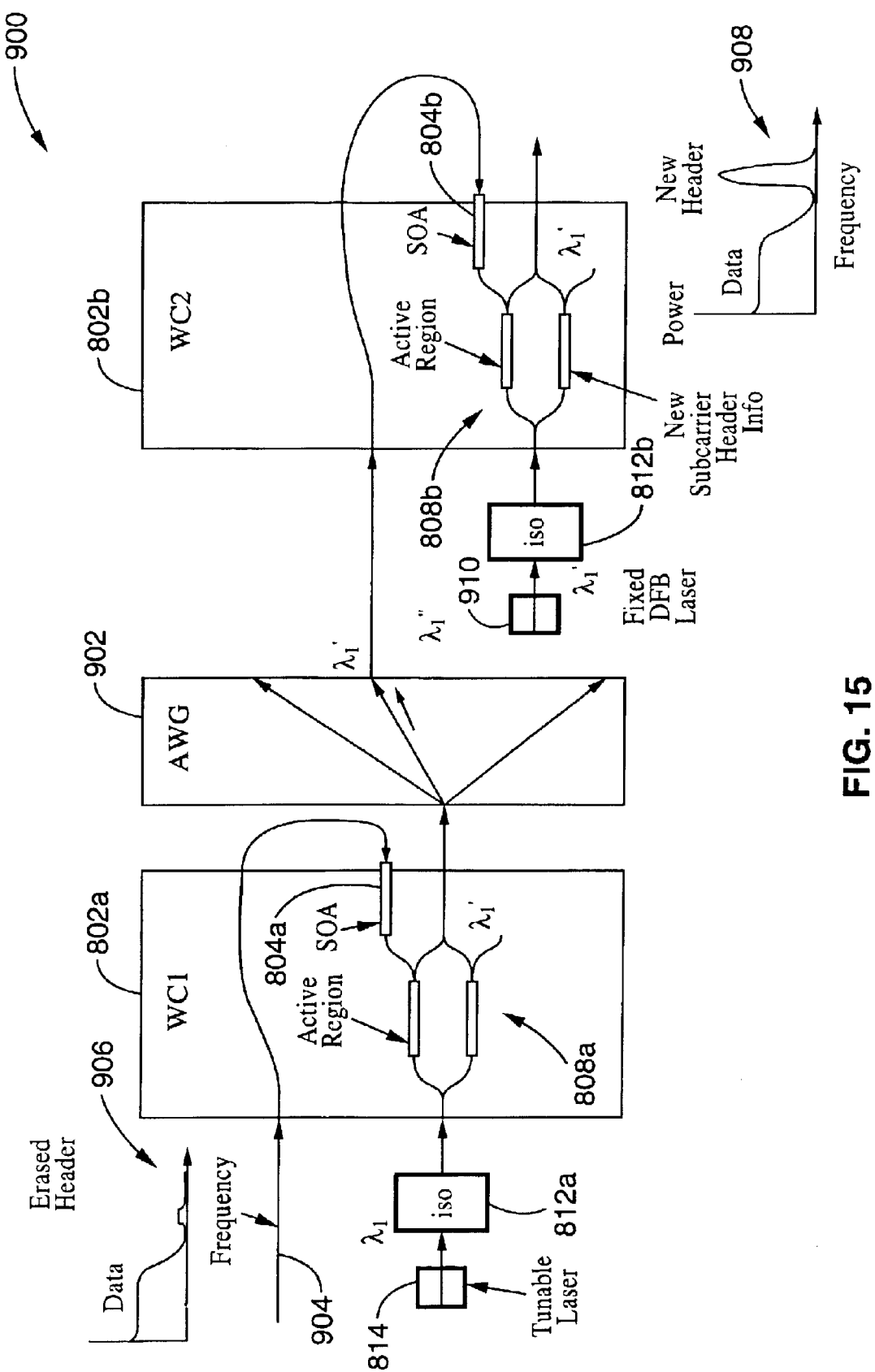
FIG. 15 is a schematic diagram of an optical router according to the present invention showing arrays of wavelength converter devices in WC1 and WC2 and an arrayed waveguide grating (AWG) the switching fabric.

FIG. 15 illustrates the arrays of wavelength converter devices in the context of the optical router switching fabric 900 incorporating an AWG 902. It also shows optical-label switching signals 904 coming into WC1 802a after the header removal 906, and a new optical label header 908 being added at the output of WC2 802b. Note that WC2 employs a fixed diffused Bragg reflector laser 910. The optical header technologies will be discussed in the following subsection.

The core of the inventive optical router can be used in any network architecture. When used with an optical-label switched network, the wavelength converter in WC2 can write a new subcarrier header by modulating one of the arms of the MZ wavelength converter. The header remover and other techniques will be discussed in the next section.

Tunable Laser

Figure 16:
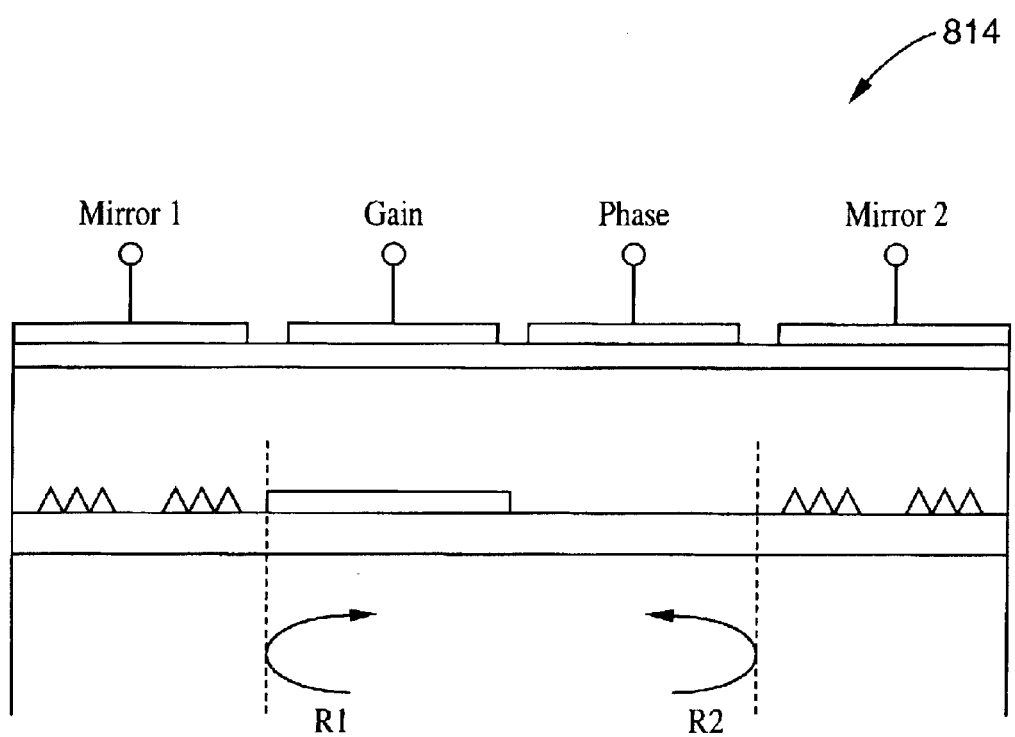
FIG. 16 is a schematic diagram of an example of a device layout of a sampled grating Bragg reflector tunable laser with four-section extended tuning range according to the present invention.

A rapidly and widely tunable laser will incorporate four section sampled distributed Bragg reflector lasers (SDBRs). The tuning in these lasers are achieved by current injection into the front reflector, the back reflector, and the phase region. FIG. 16 shows a schematic of an example of tunable laser 814 suitable for this purpose.

The rapid current injection can achieve nanosecond tuning. Such rapidly tunable lasers are currently commercially available, and we may seek procuring them or we may investigate novel integration with the wavelength converter as illustrated in FIG. 13.

Optical Header Technology

Figure 17:
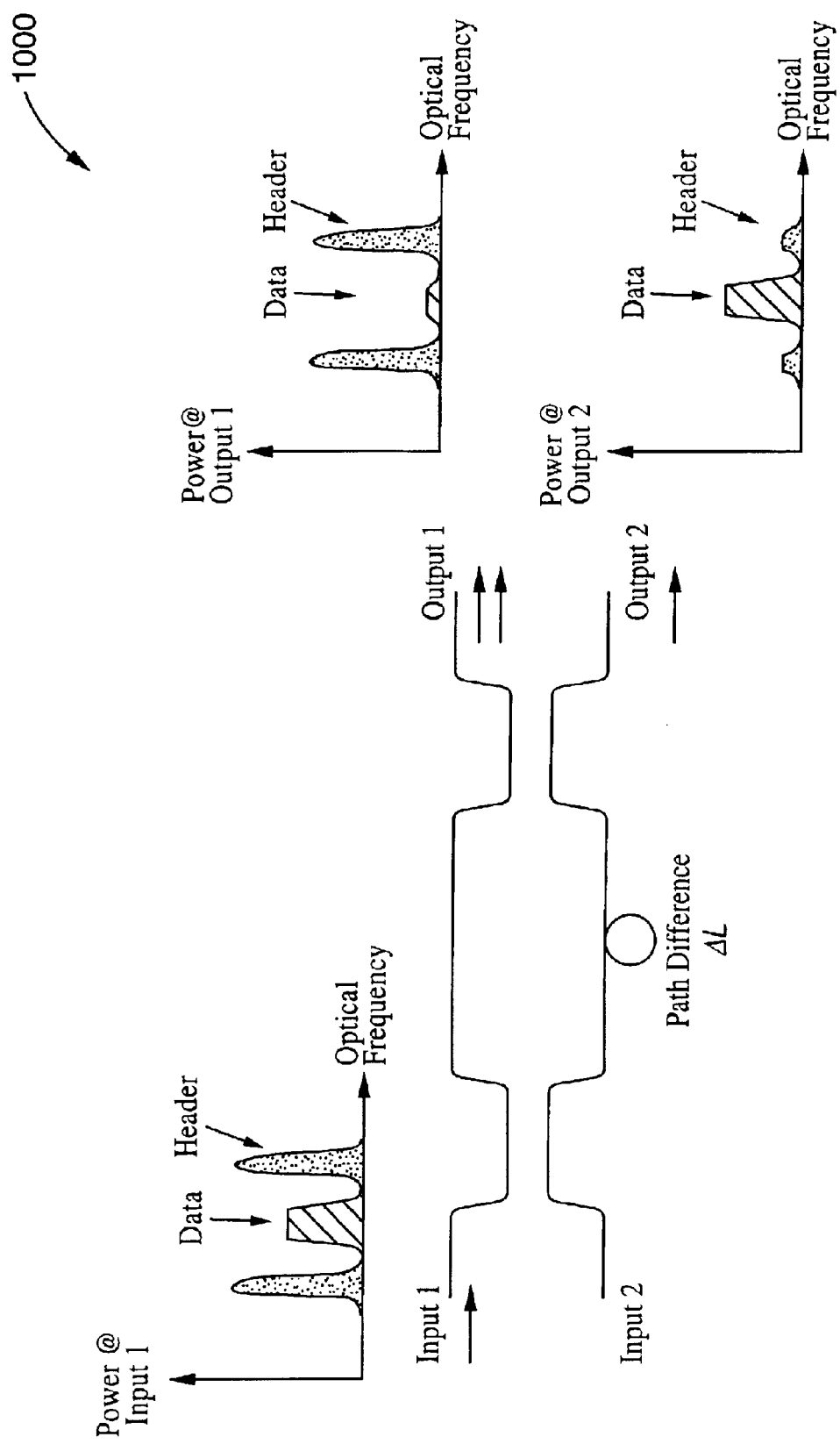
FIG. 17 is a schematic diagram depicting an all-optical method according to the present invention for separating optical-header and the data payload where a Mach-Zehnder interferometer output will separate the two.

As will be appreciated from the foregoing discussion, the optical header technology of the present invention includes optical header encoding, optical header decoding, and optical header erasing. The optical-label swapping preferably is accomplished by a combination of optical header erasing and optical header encoding. The optical header erasing and decoding preferably utilize an all optical technique. All optical separation of header and data-payload is possible by using wavelength selective elements such as Mach-Zehnder filters or fiber Bragg gratings (FBGs). FIG. 17 depicts a polarization independent Mach-Zehnder filter 1000, which separates subcarrier header and the data payload signals into two separate output ports. The path length difference between the two arms of the Mach-Zehnder filter is chosen so that the frequency separation of the nulls of output 1 and output 2 match the subcarrier modulation frequency. This corresponds to approximately 2 cm for a conventional fiber provided that the subcarrier frequency is 10 GHz. The square law detection by a standard photodiode achieves an extraction of the header baseband information, and there is no need for additional RF circuits after the detector. If multiple wavelength channels are present in the Input1, each channel will undergo separation of the header and the data provided that the channel spacing is an integer multiple of subcarrier frequency.

Figure 18:
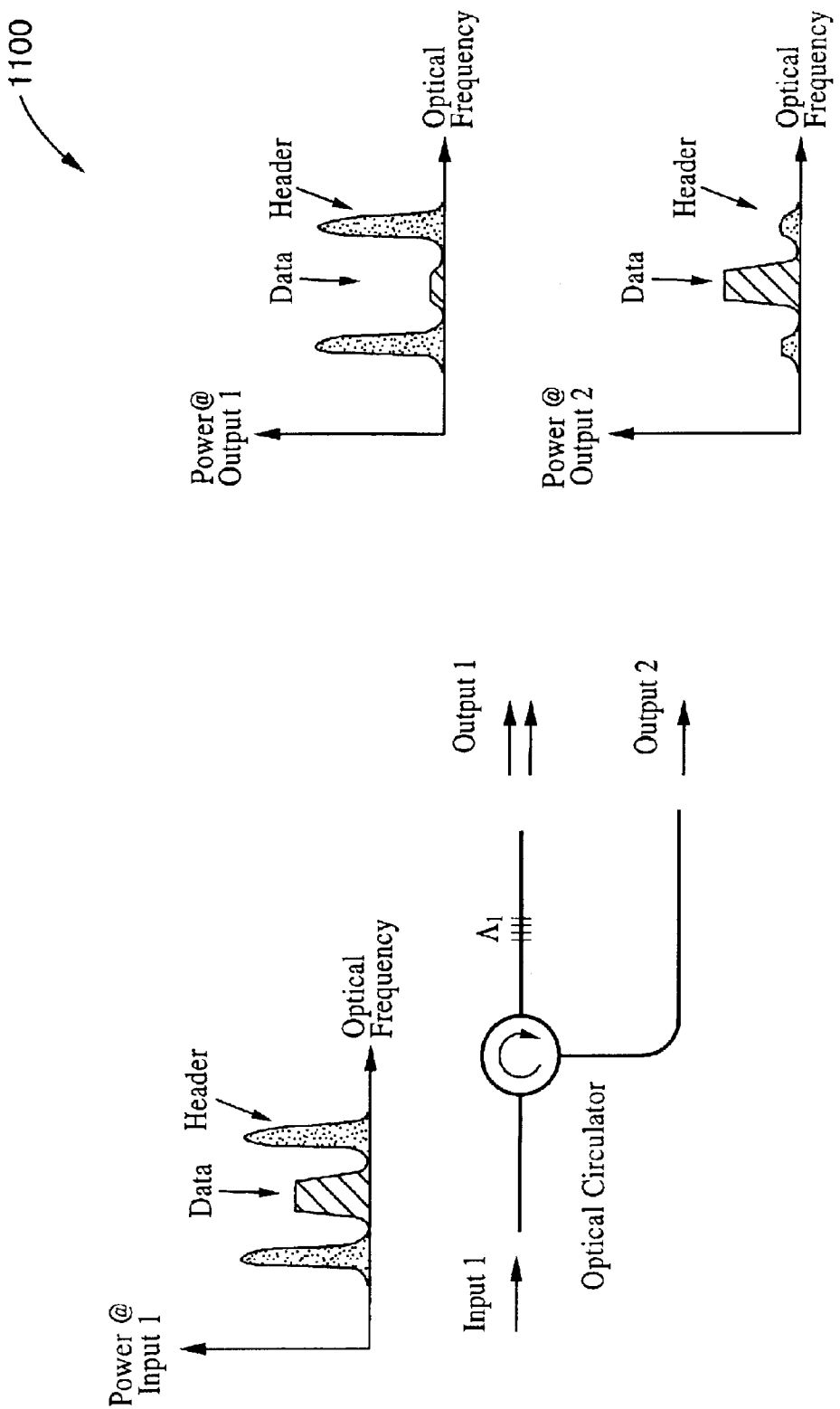
FIG. 18 is a schematic diagram depicting an all-optical method according to the present invention for separating optical-header and the data payload where a fiber Bragg grating whose peak reflectivity occurs at the center wavelength of the data payload can separate the two.

FIG. 18 shows another preferred embodiment illustrating fiber Bragg gratings (FBGs) 1100. This method has an advantage of providing more flexibility to the choice of RF frequencies. In other words, the bandwidth of the FBG must be narrower than that of the subcarrier frequency. However, it must incorporate many periods of FBGs to filter multiple wavelengths.

Figure 19:
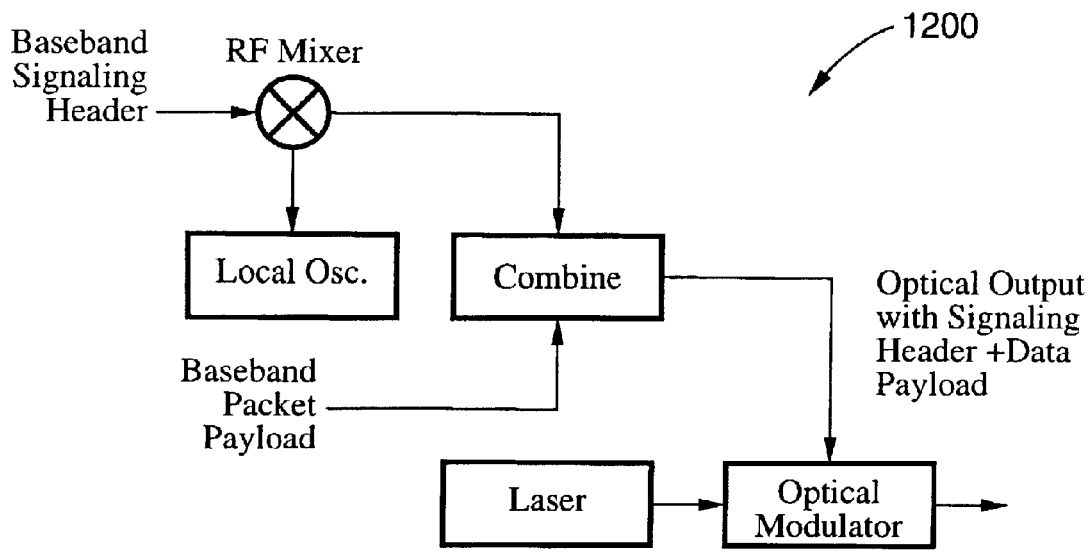
FIG. 19 is a functional block diagram of a header encoder where signaling header information and data payload are combined and encoded on the optical carrier.
Figure 20:
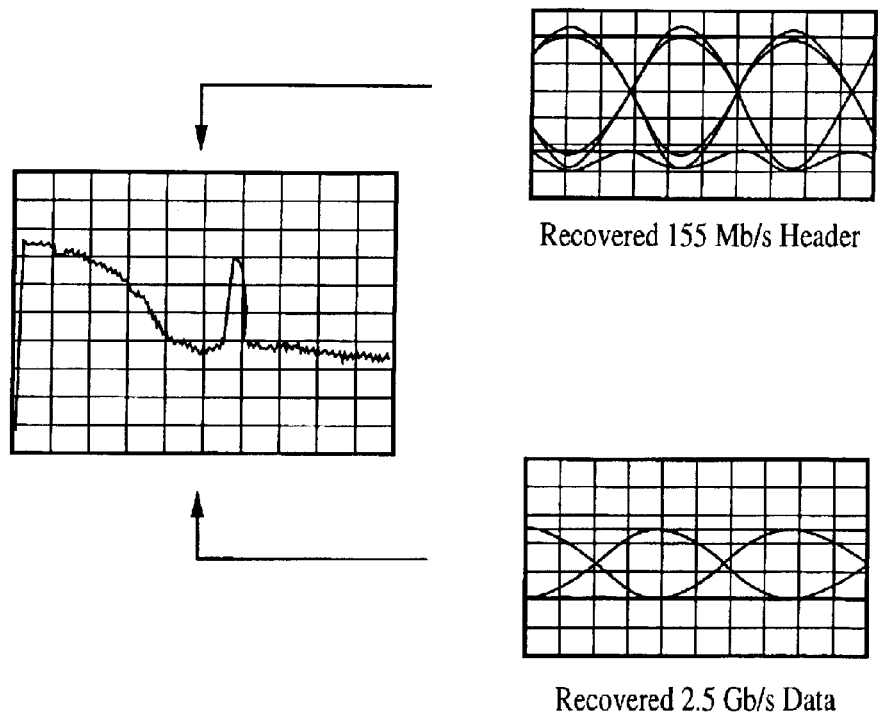
FIG. 20 shows the spectrum of the signaling header and data payload encoded by double side subcarrier multiplexing using the encoder shown in FIG. 19.

Referring to FIG. 19 which shows a functional block diagram of a header encoder 1200 where signaling information and data payload are combined and enclosed on the optical carrier, optical header encoding employs a standard double-side subcarrier multiplexing technique involving conventional RF mixers, local oscillators, electronic amplifiers, combiners, lasers, and LiNbO$_3$ optical modulators. FIG. 20 depicts the spectrum of the signaling header and data payload that has been encoded by double side subcarrier multiplexing.

Systems Integration

Figure 21:
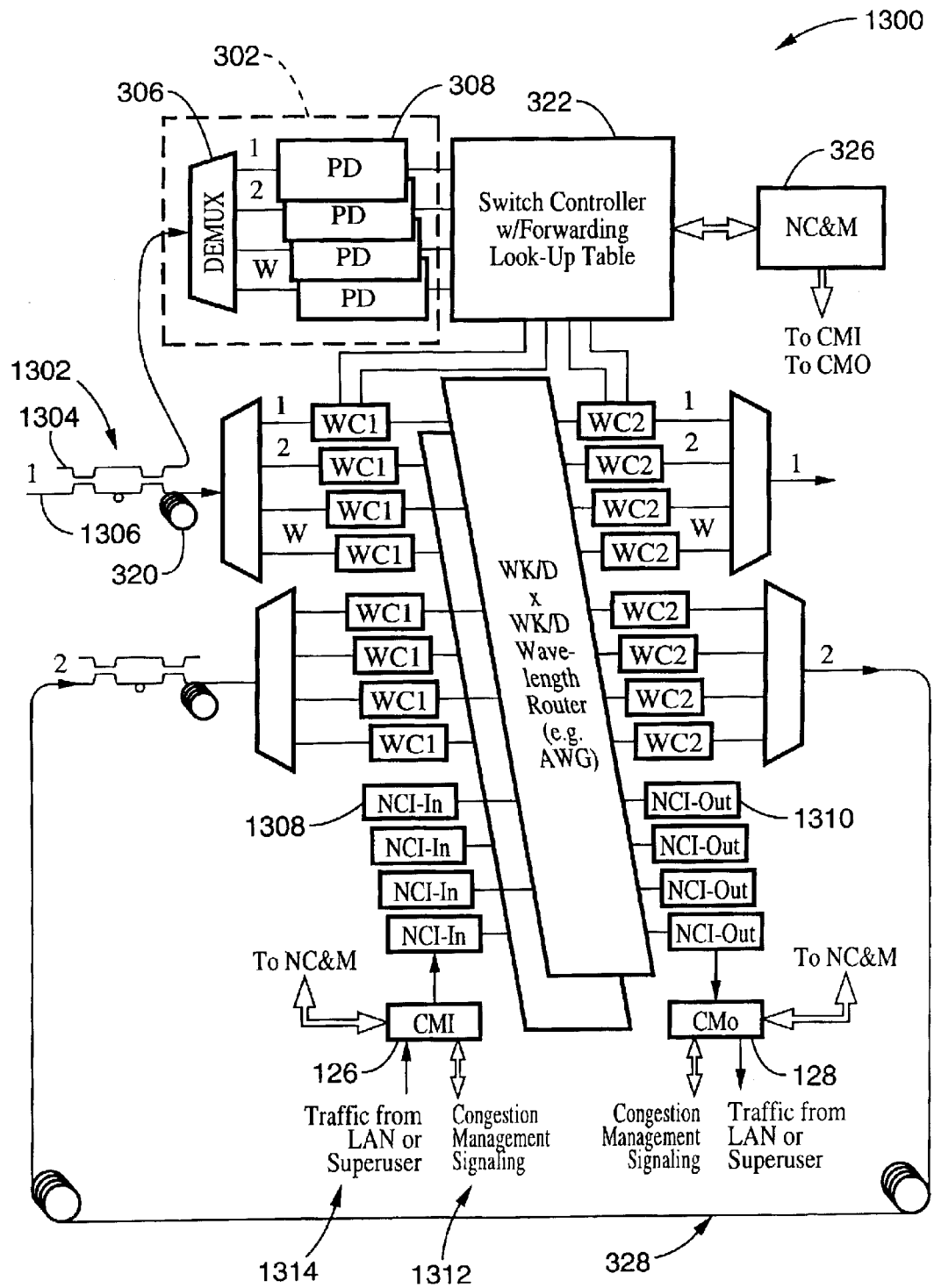
FIG. 21 is a schematic diagram showing an optical router according to the present invention configured in an optical-label switching network.

Systems integration achieves integration of all of the previously described inventive optical technologies into an optical router with out of band (1510 nm) signaling for network control and management (NC&M). FIG. 21 shows a schematic of a optical router 1300 which integrates the technologies. Note the similarity to the optical router depicted in FIG. 7. Router 1300 as shown in FIG. 21 employs the same basic architecture using a two-layer AWG architecture in the switch fabric. The following description will focus on the differences between the router of FIG. 21 and the router of FIG. 7 for simplicity.

In the schematic of FIG. 21, the optical label and the data payload are separated by the polarization independent 2×2 asymmetric Mach-Zehnder filter 1302. The upper port 1304 provides multiple optical-labels on multiple wavelengths which are subsequently demultiplexed by demultiplexer 306 and detected by simple photodiodes 308 to recover header information on each wavelength. The lower port 1306 provides the data payload which will be delayed by the optical fiber 320 to provide time for the header information to be processed, a forwarding decision to be made, and tuning of the wavelength converter output to take place. We envision this time delay would be less than 100 nsec, which can be brought shorter by advanced Application Specific Integrated Circuit (ASIC) designs. The switch fabric will route signals based on the decision made by the forwarding table 322, and the signals will be routed to the output wavelength of the output port according to the decision. At that point, the packet will obtain a new optical-label written by an output wavelength converter WC2. The packet to be buffered will loop around a fiber delay line 328 and will go through another decision and forwarding cycle. The forwarding decision will coordinate so that packets do not loop too many times. The packet can also be dropped to the client through a NCI-Out (Non-Compliant Interface-Out). CMo 128 will take appropriate actions to interface the packet to the LAN. CMi 126 allows packets to be transported into the Supernet and coordinates with the NC&M to acquire an appropriate optical-label. Both CMi 126 and CMo 128 have electronic buffer memories and congestion management interfacing with the LAN and the Supernet.

Switching Conflict Resolution in the Optical Router

Referring now to FIG. 22A through FIG. 22E, an example of a method for resolving switching conflicts in the optical router of the present invention is shown. As indicated previously, the optical router can make one, or any combination of the following three choices: wavelength conversion, time-buffering, and path deflection. Additionally, as a last resort, a newly arrived packet may be allowed to preempt a currently transmitting packet if the arriving packet has a higher priority and alternate wavelength, buffering, or path deflection routings are not available.

Figure 22A:
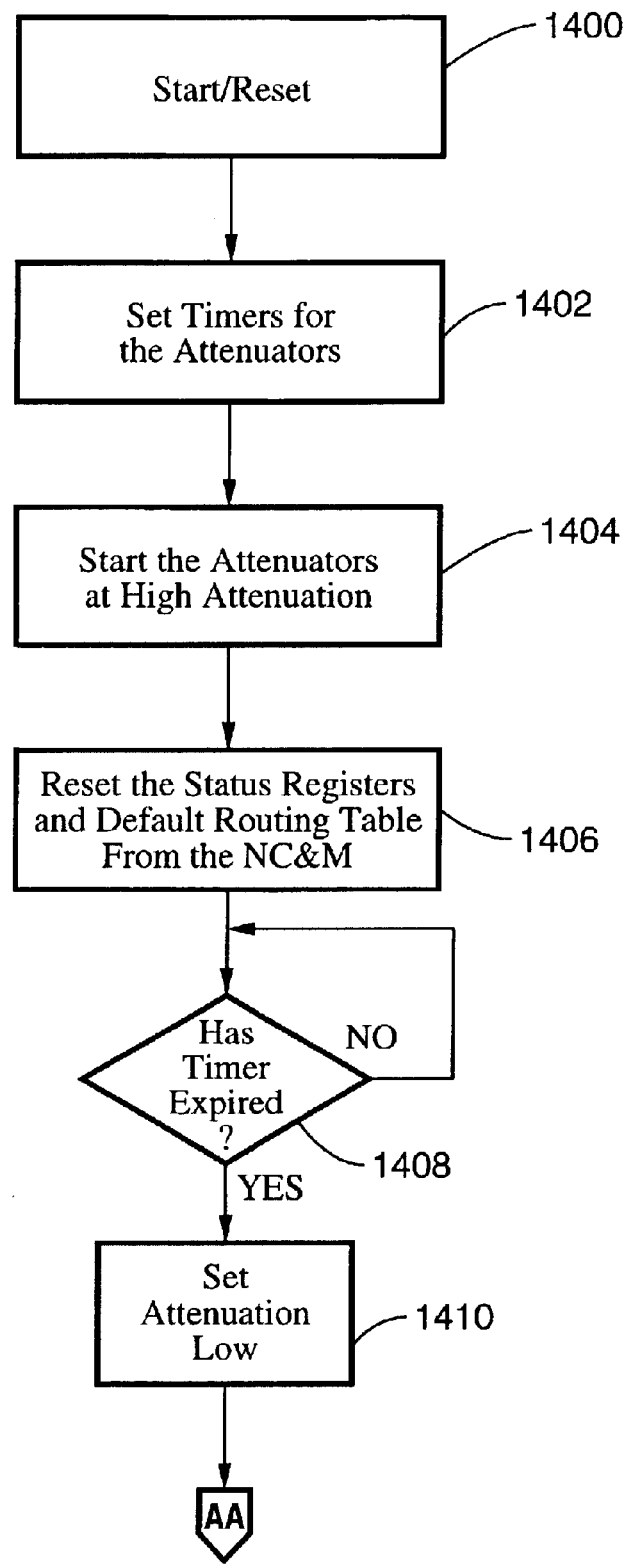
FIG. 22A through FIG. 22F are a flow chart of a method for resolving routing conflicts according to the invention.

Referring first to FIG. 22A, the method begins with an initialization/reset routing. First, a start/reset step is executed at block 1400. The timers are then set for the output power attenuators at block 1402. Next, the attenuators are set to high attenuation at block 1404 so that at the coldstart, there will be no output from the optical router. The status registers and default routing table from the NC&M at block 1406 according to the method shown in FIG. 22G. At block 1408, the timer is tested for expiration. If the timer has not expired, the method waits for the timer to expire. At block 1410, the attenuator is set to low attenuation so that output of the optical router can be transported.

Figure 22B:
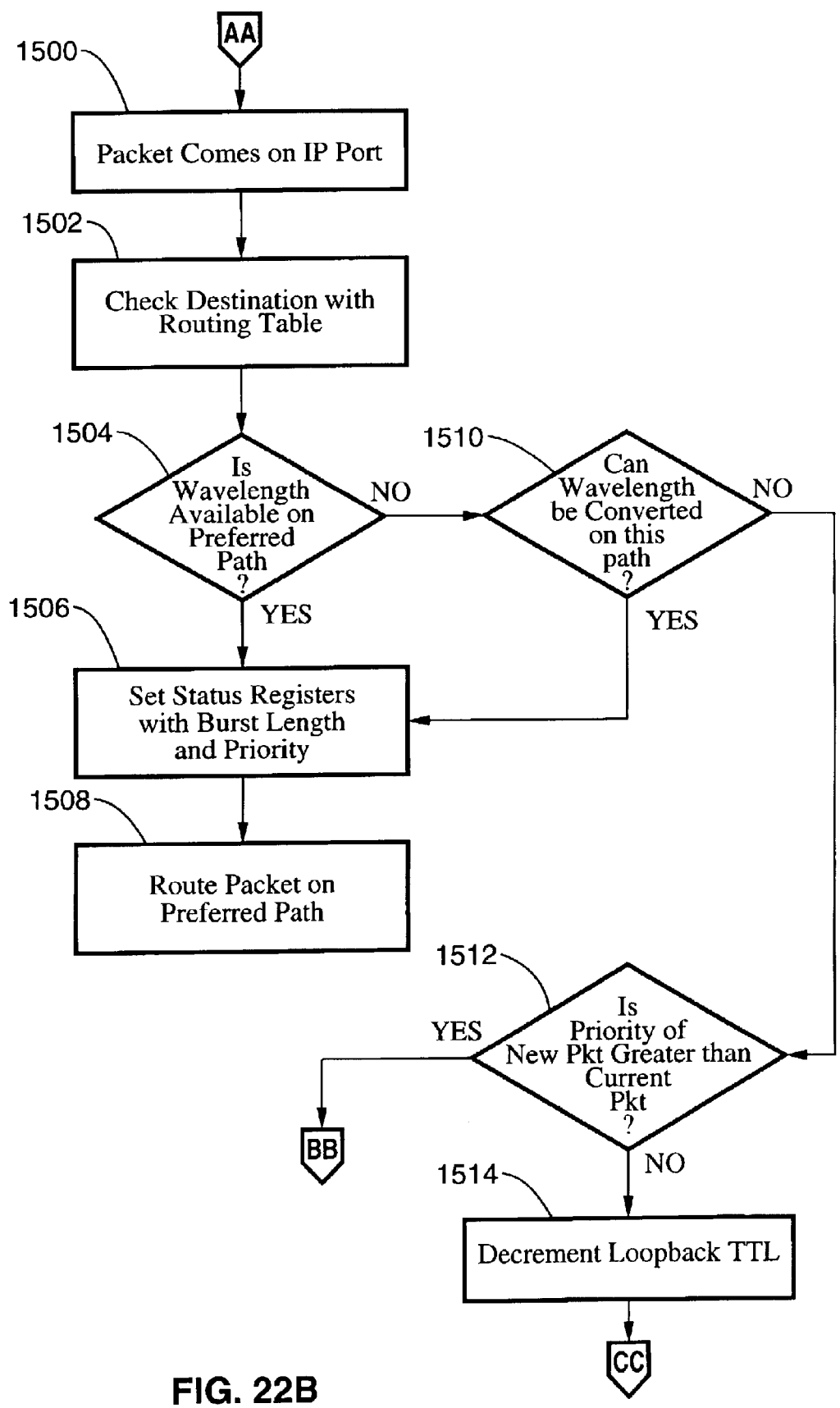
Figure 22C:
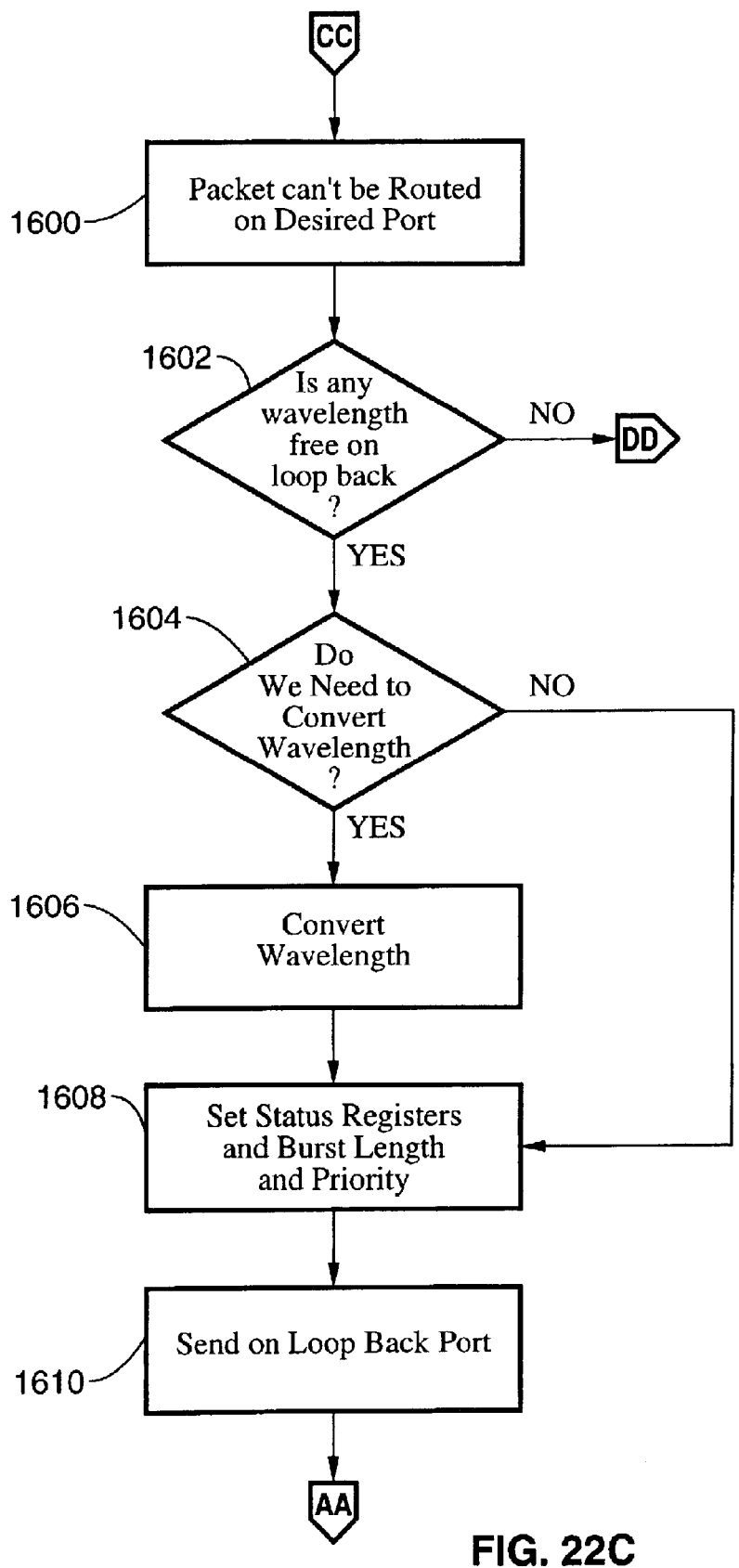

Referring to FIG. 22B, once the timer has expired, a normal operation/wavelength conversion mode is entered at 1500 where a packet is received on an IP port. Next, the destination is checked against the routing table at block 1502. At block 1504, the packet is tested to determine if the wavelength is available on the preferred path. If it is, the status registers are set with the burst length and priority at block 1506 and the packet is routed on the preferred path at block 1508. On the other hand, if the wavelength was not available on the preferred path, a determination is made at block 1510 as to whether the wavelength can be converted on the preferred path. If so, the wavelength is converted and the method proceeds to block 1506. Otherwise, at block 1512 a determination is made as to whether the priority of a new packet is greater than the priority of the current packet. If the priority of the new packet is greater, then a priority handling routine (FIG. 22G) is executed. Otherwise, the loop back TTL is decremented at block 1514 and an optical time buffering routine is invoked at block 1600 as shown in FIG. 22C because the packet cannot be routed on the preferred path.

At block 1602, a determination is made as to whether any wavelength is free on the loop back. If it is, a determination is made at block 1604 as to whether there is a need to convert the wavelength. If so, the wavelength is converted at block 1606, the status registers, burst length, and priority are set at block 1608, the packet is sent on the loop back port at block 1610, and the method returns to block 1500 in FIG. 22B. If wavelength conversion was not determined to be necessary at block 1604, the wavelength conversion block 1606 is bypassed.

Figure 22D:
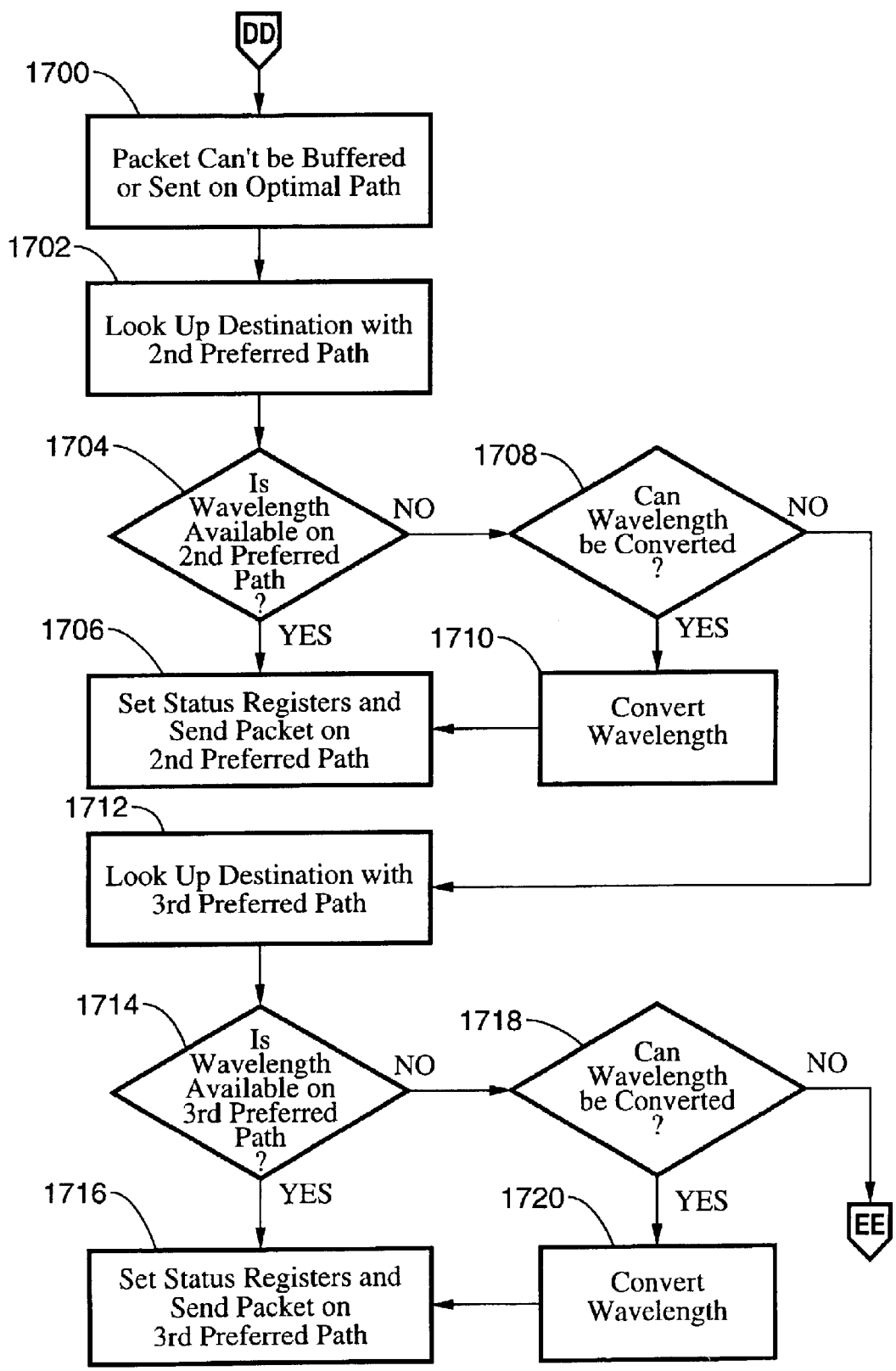

If no wavelength was free on the loop back as determined at block 1602, a path deflection routing routine is invoked at block 1700 as shown in FIG. 22D because the packet could not be buffered or sent on the preferred path. Accordingly, at block 1702 the routing table is consulted to identify a second preferred path. At block 1704 a determination is made as to whether a wavelength is available on the second preferred path. If so, the status registers are set and the packet is sent on the second preferred path at block 1706. On the other hand, if no wavelength was available for the second preferred path as determined at block 1704, a determination is made at block 1708 as to whether that wavelength can be converted. If conversion is possible, then the wavelength is converted at block 1710 and the packet sent at block 1706. If the wavelength cannot be converted as determined at block 1708, the routing table is consulted at block 1712 to identify a third preferred path. At block 1713, a determination is made as to whether a wavelength is available on the third preferred path. If a wavelength is available, then the status registers are set and the packet is sent on the third preferred wavelength at block 1716. On the other hand, if a wavelength was not available on the third preferred path as determined at block 1714, a determination is made at block 1718 as to whether the wavelength can be converted. If the wavelength can be converted, it is converted at block 1720 and the packet is sent at block 1716. If the wavelength cannot be converted as determined at block 1718, a drop packet routine is entered at block 1800 as shown in FIG. 22E since the packet is unroutable.

Figure 22E:
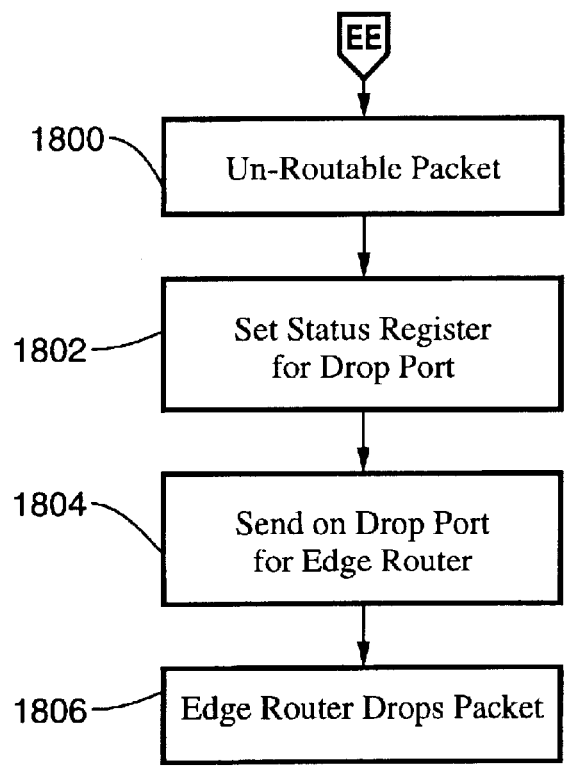

Referring to FIG. 22E, at block 1802, the status register is set for a drop packet port. Next, at block 1804 the packet is sent on the drop packet port for the edge router. Finally, at block 1806, the edge router drops the packet.

Figure 22F:
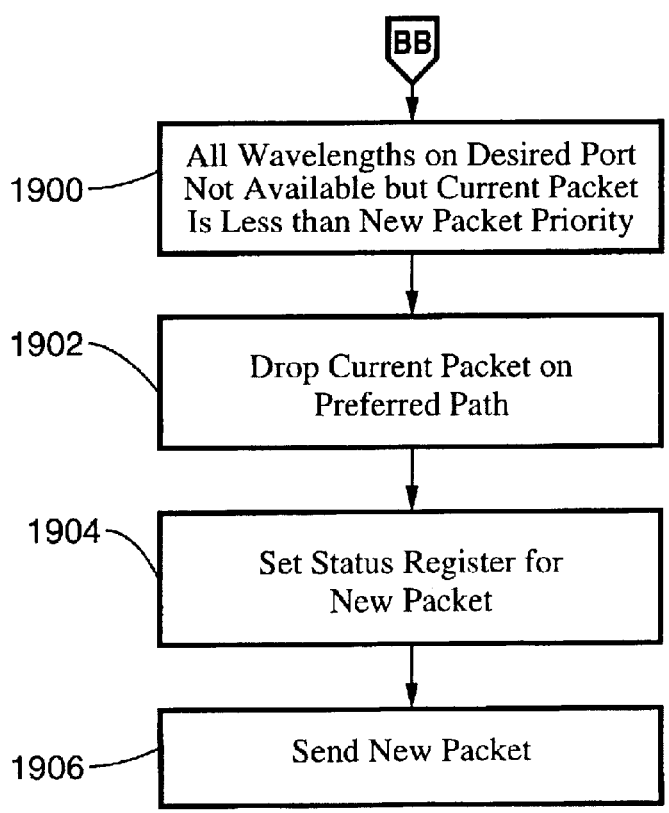

Referring again to FIG. 22B, if the priority of the new packet determined to be greater than the current packet in block 1512, then a priority handler routine is invoked at block 1900 as shown in FIG. 22F. At block 1902 the current packet is dropped, the status register is set for the new packet at block 1904, and the new packet is sent at block 1906.

Figure 22G:
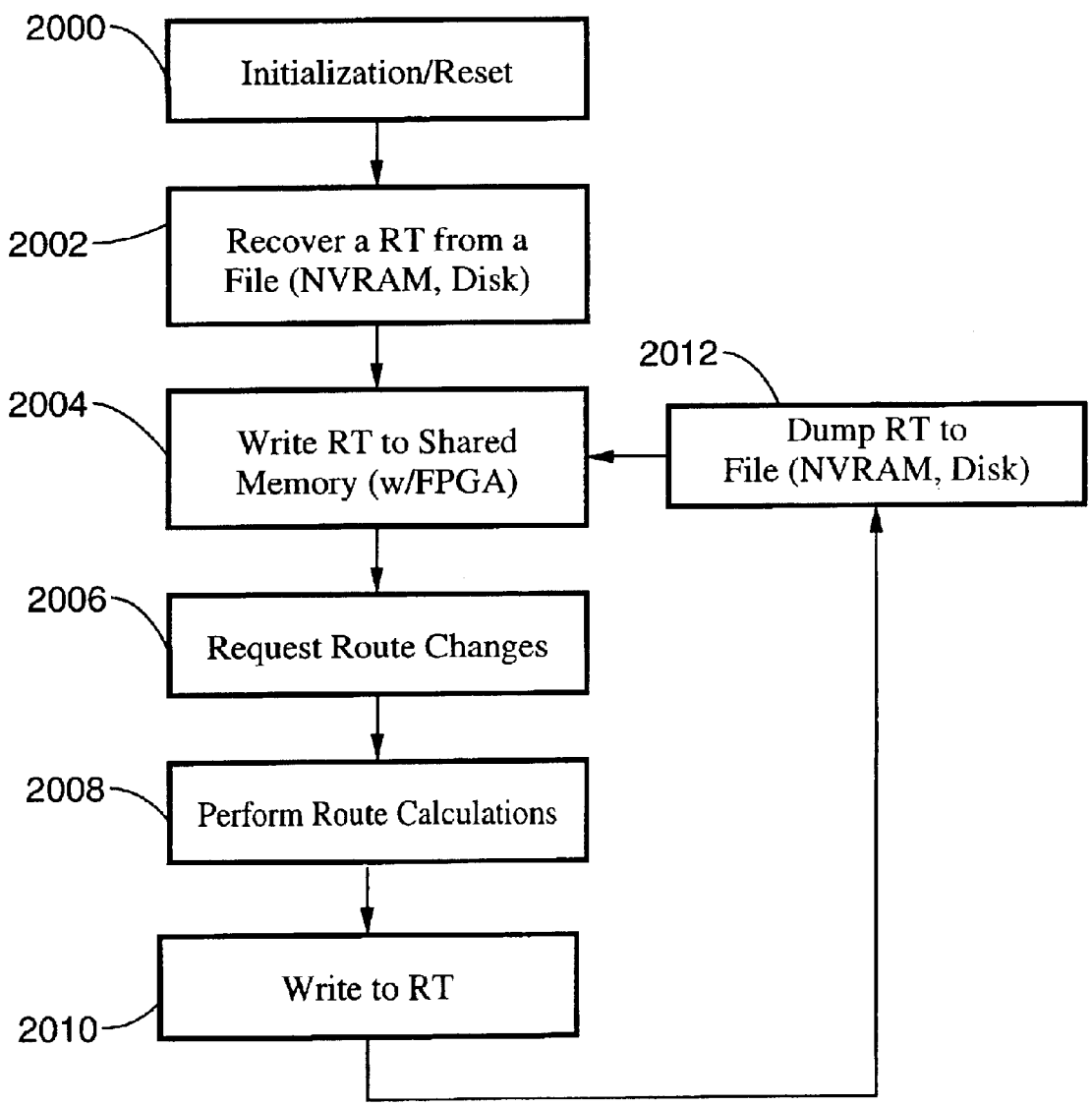

Referring now to FIG. 22G, at block 2000 the routine for resetting the status registers and the default routing table from the NC&M at block 1406 in FIG. 22A is invoked. At block 2002, a routing table is read from a file, such as from non-volatile random access memory (NVRAM) or a disk. At block 2004, the routing table is written to shared memory such as a field programmable gate array (FPGA). Next, at block 2006, route changes are requested. Route calculations are then performed at block 2008 and written to the routing table at block 2010. The routing table is then stored to a file at bock 2012, and written to shared memory at block 2004.

Higher layer protocol such as TCP, or NC&M can request retransmission of the packet if necessary.

It will be appreciated, therefore, that the following are aspects of the invention described herein:

1. An ultra-low latency optical router with a peta-bit-per-second total aggregate switching bandwidth;
2. An optical router achieving scalable increases in number of ports and wavelengths;
3. An optical router with a switching architecture that can evolve from no wavelength conversion to limited wavelength conversion, and eventually to full wavelength conversion
4. A switching fabric that is all-optical requiring no electronic or mechanical components;
5. A switching fabric that achieve space, time, and wavelength switching by means of wavelength conversion alone;
6. A switching fabric that achieves regeneration of signal quality and extinction ratio;
7. A switching fabric realized by arrayed waveguide gratings that can be integrated in three dimensions;
8. An advanced wavelength conversion technology for achieving contention resolution a router such as deflection in wavelength, deflection in space, and buffering;
9. An optical router for interfacing a local network to the Supernet;
10. An optical router capable of interfacing networks of any protocol for data;
11. An optical router requiring less than 100 W power dissipation to achieve a terabit per second total aggregate switching bandwidth;

12. An optical router whose power dissipation scales linearly as the product of the number of wavelengths and the number of ports;

13. A method for managing congestion through the optical router achieving end-to-end congestion management in collaboration with local area or metropolitan area routers;

14. End-to-end congestion management using hierarchical methods of multiple congestion methods of multiple domain networks;

15. An optical router capable of monitoring traffic condition, traffic pattern, and signal quality by monitoring optical labels;

16. An optical router capable of monitoring traffic using optical-label content and to judge the signal quality of the data payload using a simple error checking on the label;

17. An optical router capable of removing headers using all-optical methods such as fiber-Bragg-grating method;

18. An optical router whose power dissipation scales linearly as the product of the number of port and the number of wavelengths;

19. A switching fabric architecture allowing regeneration of wavelength and polarization;

20. An optical router achieving contention resolution by one or a combination of the following methods: deflection in time, deflection in space, and deflection in wavelength;

21. An optical router achieving the three contention resolution methods in Item 20 above by wavelength conversion as the sole switching mechanism;

22. An optical router achieving extremely low latency by wavelength conversion at the edge of the switching fabric;

23. An optical router capable of multicasting the packet using all optical methods; and 24. An optical router capable of accommodating any network switching methods including, but not limited to, circuit switching, burst switching, flow switching, multi-protocol label switching, and packet switching.

Those skilled in the art will appreciate that, except as specifically described herein, the invention employs conventional optical, electro-optical, and electronic components, programmable data processors, memory, an input/output (I/O) controllers, and the like. It will also be appreciated that other devices and subsystems could be included, and that the devices and subsystems shown may be interconnected in different ways than shown herein. It will further be appreciated that not all of the devices shown are necessary to practice the present invention, and that software for the invention may be implemented for various platforms using conventional programming techniques.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An optical router comprising:
   (a) an optical wavelength router having an input and output;
   (b) an input optical wavelength converter stage having an input and an output, said converter stage being tunable;
   (c) an output optical wavelength converter stage having an input and an output;
   (d) wherein said output of said input wavelength converter stage is connected to said input of said wavelength router,
   (e) wherein said input of said output wavelength converter stage is connected to said output of said wavelength router;
   (f) wherein said optical router is configured for contention resolution by time, space or wavelength domain switching, or a combination thereof, by tuning of said input optical wavelength converter stage; and
   (g) wherein optical signals remain in optical form throughout switching, forwarding and transport by said optical router;
   (h) a programmable data processor; and
   (i) programming executable on said data processor for resolving switching conflicts by carrying out the operations of:
      (i) receiving a data packet having an optical wavelength and a destination;
      (ii) determining the preferred path to the destination from a routing table;
      (iii) testing the packet to determine if the wavelength is available on the preferred path;
      (iv) routing the packet on the preferred path if the wavelength is available on the preferred path;
      (v) if the wavelength was not available on the preferred path, determining if the wavelength can be converted to a wavelength available on the preferred path; and
      (vi) if the wavelength can be converted to a wavelength available on the preferred path, converting the wavelength and routing the packet on the preferred path.

2. An optical router as recited in claim 1, wherein said programming further carries out the operations of:
   (vii) if the wavelength of the packet cannot be converted to a wavelength available on the preferred path at step (vi), determining if any wavelength is free on a loop back port;
   (viii) determining if wavelength conversion is needed;
   (ix) if wavelength conversion is needed, converting the wavelength, sending the packet on the loop back port, and repeating steps (iii) through (vi); and (x) if wavelength conversion is not needed, repeating steps (iii) through (vi).

3. An optical router as recited in claim 2, wherein said programming further carries out the operations of:
(xi) if no wavelength was available at step (vii), determining a second preferred path from the routing table;
(xii) determining if a wavelength is available on the second preferred path;
(xiii) routing the packet on the second preferred path if the wavelength is available on the second preferred path;
(xiv) if the wavelength was not available on the second preferred path, determining if the wavelength can be converted to a wavelength available on the second preferred path; and
(xv) if the wavelength can be converted to a wavelength available on the second preferred path, converting the wavelength and routing the packet on the second preferred path.

4. An optical router comprising:
(a) an input port;
(b) a first plurality of tunable optical wavelength converters having inputs connected to said input port;
(c) an output port;
(d) a second plurality of optical wavelength converters having outputs connected to said output port; and
(e) an optical wavelength router connected between said first plurality of wavelength converters and said second plurality of wavelength converters;
(f) wherein said optical router is configured for contention resolution by time, space or wavelength domain switching, or a combination thereof, by tuning of a converter in said first plurality of tunable optical wavelength converters; and
(g) wherein optical signals remain in optical form throughout switching, forwarding and transport by said optical router;
(h) a programmable data processor; and
(i) programming executable on said date processor for resolving switching conflicts by carrying out the operations of:
(i) receiving a data packet having an optical wavelength and a destination;
(ii) determining a preferred path to the destination from a routing table;
(iii) testing the packet to determine if the wavelength is available on the preferred path;
(iv) routing the packet on the preferred path if the wavelength is available on the preferred path;
(v) if the wavelength was not available on the preferred path, determining if the wavelength can be converted to a wavelength available on the preferred path; and
(vi) if the wavelength can be converted to a wavelength available on the preferred path, converting the wavelength and routing the packet on the preferred path.

5. An optical router as recited in claim 4, wherein said programming further carries out the operations of:
(vii) if the wavelength of the packet cannot be converted to a wavelength available on the preferred path at step (vi), determining if any wavelength is free on a loop back port;
(viii) if a wavelength is free on the loop back port, determining if wavelength conversion is needed;
(ix) if wavelength conversion is needed, converting the wavelength, sending the packet on the loop back port, and repeating steps (iii) through (vi); and (x) if wavelength conversion is not needed, sending the packet on the loop back port, and repeating steps (iii) through (vi).

6. An optical router as recited in claim 5, wherein said programming further carries out the operations of:
(xi) if no wavelength was available on the loop back port at step (vii), determining a second preferred path from the routing table;
(xii) determining if a wavelength is available on the second preferred path;
(xiii) routing the packet on the second preferred path if the wavelength is available on the second preferred path;
(xiv) if the wavelength was not available on the second preferred path, determining if the wavelength can be converted to a wavelength available on the second preferred path; and
(xv) if the wavelength can be converted to a wavelength available on the second preferred path, converting the wavelength and routing the packet on the second preferred path.

7. A method for resolving switching conflicts in an all-optical router, comprising:
(a) receiving a data packet having an optical wavelength and a destination;
(b) determining a preferred path to the destination from a routing table;
(c) testing the packet to determine if the wavelength is available on the preferred path;
(d) routing the packet on the preferred path if the wavelength is available on the preferred path;
(e) if the wavelength was not available on the preferred path, determining if the wavelength can be converted to a wavelength available on the preferred path; and
(f) if the wavelength can be converted to a wavelength available on the preferred path, converting the wavelength and routing the packet on the preferred path;
(g) wherein said optical router comprises
(i) an optical wavelength router having an input and output;
(ii) an input optical wavelength converter stage having an input and an output, said converter stage being tunable; and
(iii) an output optical wavelength converter stage having an input and an output;
(iv) wherein said output of said input wavelength converter stage is connected to said input of said wavelength router;
(v) wherein said input of said output wavelength converter stage is connected to said output of said wavelength router;
(vi) wherein said optical router is configured for contention resolution by time, space or wavelength domain switching, or a combination thereof, by tuning of said input optical wavelength converter stage; and
(vii) wherein optical input data remains in optical form throughout switching, forwarding and transport by said optical router.

8. A method as recited in claim 7, further comprising:
(g) if the wavelength of the packet cannot be converted to a wavelength available on the preferred path at step (f), determining if any wavelength is free on a loop back port;
(h) if a wavelength is free on the loop back port, determining if wavelength conversion is needed;

(i) if wavelength conversion is needed, converting the wavelength, sending the packet on the loop back port, and repeating steps (c) through (f); and (j) if wavelength conversion is not needed, sending the packet on the loop back port, and repeating steps (c) through (f).

9. A method as recited in claim 8, further comprising:

(k) if no wavelength was available on a loop back port at step (g), determining a second preferred path from the routing table;

(l) determining if the wavelength is available on the second preferred path;

(m) routing the packet on the second preferred path if the wavelength is available on the second preferred path;

(n) if the wavelength was not available on the second preferred path, determining if the wavelength can be converted to a wavelength available on the second preferred path; and (o) if the wavelength can be converted to a wavelength available on the second preferred path, converting the wavelength and routing the packet on the second preferred path.

10. A method for resolving switching conflicts in an optical router, comprising:

(a) receiving a data packet having an optical wavelength and a destination;

(b) determining a preferred path to the destination from a routing table;

(c) testing the packet to determine if the wavelength is available on the preferred path;

(d) routing the packet on the preferred path if the wavelength is available on the preferred path;

(e) if the wavelength was not available on the preferred path, determining if the wavelength can be converted to a wavelength available on the preferred path;

(f) if the wavelength can be converted to a wavelength available on the preferred path, converting the wavelength and routing the packet on the preferred path, (g) if the wavelength of the packet cannot be converted to a wavelength available on the preferred path at step (f), determining if any wavelength is free on a loop back port;

(h) if a wavelength is free on the loop back port, determining if wavelength conversion is needed;

(i) if wavelength conversion is needed, converting the wavelength, sending the packet on the loop back port, and repeating steps (c) through (f); and (j) if wavelength conversion is not needed, sending the packet on the loop back port, and repeating steps (c) through (f).

11. A method as recited in claim 10, further comprising:

(k) if no wavelength was available on a loop back port at step (g), determining a second preferred path from the routing table;

(l) determining if the wavelength is available on the second preferred path;

(m) routing the packet on the second preferred path if the wavelength is available on the second preferred path;

(n) if the wavelength was not available on the second preferred path, determining if the wavelength can be converted to a wavelength available on the second preferred path; and (o) if the wavelength can be converted to a wavelength available on the second preferred path, converting the wavelength and routing the packet on the second preferred path.

12. An optical router, comprising:

(a) an optical wavelength router having an input and output;

(b) an input optical wavelength converter stage having an input and an output, said converter stage being tunable; and (c) an output optical wavelength converter stage having an input and an output;

(d) wherein said output of said input wavelength converter stage is connected to said input of said wavelength router;

(e) wherein said input of said output wavelength converter stage is connected to said output of said wavelength router;

(f) wherein tuning said input wavelength converter stage can achieve time, space or wavelength domain switching;

(g) a programmable data processor; and (h) programming executable on said data processor for resolving switching conflicts by carrying out the operations of:

(i) receiving a data packet having an optical wavelength and a destination;

(ii) determining the preferred path to the destination from a routing table;

(iii) testing the packet to determine if the wavelength is available on the preferred path;

(iv) routing the packet on the preferred path if the wavelength is available on the preferred path;

(v) if the wavelength was not available on the preferred path, determining if the wavelength can be converted to a wavelength available on the preferred path;

(vi) if the wavelength can be converted to a wavelength available on the preferred path, converting the wavelength and routing the packet on the preferred path;

(vii) if the wavelength of the packet cannot be converted to a wavelength available on the preferred path at step (vi), determining if any wavelength is free on a loop back port;

(viii) determining if wavelength conversion is needed;

(ix) if wavelength conversion is needed, converting the wavelength, sending the packet on the loop back port, and repeating steps (iii) through (vi); and (x) if wavelength conversion is not needed, repeating steps (iii) through (vi).

13. An optical router as recited in claim 12, wherein said programming further carries out the operations of:

(x) if no wavelength was available at step (vii), determining a second preferred path from the routing table;

(xi) determining if a wavelength is available on the second preferred path;

(xii) routing the packet on the second preferred path if the wavelength is available on the second preferred path;

(xiii) if the wavelength was not available on the second preferred path, determining if the wavelength can be converted to a wavelength available on the second preferred path; and (xiv) if the wavelength can be converted to a wavelength available on the second preferred path, converting the wavelength and routing the packet on the second preferred path.

14. An optical router, comprising:

(a) an input port;

(b) a first plurality of tunable optical wavelength converters having inputs connected to said input port;

(c) an output port;

(d) a second plurality of fixed optical wavelength converters having outputs connected to said output port;

(e) an optical wavelength router connected between said first plurality of wavelength converters and said second plurality of wavelength converters;

(f) wherein tuning a converter in said first plurality of tunable optical wavelength converters can achieve time, space or wavelength domain switching;

(g) a programmable data processor; and (h) programming executable on said data processor for resolving switching conflicts by carrying out the operations of:

(i) receiving a data packet having an optical wavelength and a destination;

(ii) determining a preferred path to the destination from a routing table;

(iii) testing the packet to determine if the wavelength is available on the preferred path;

(iv) routing the packet on the preferred path if the wavelength is available on the preferred path;

(v) if the wavelength was not available on the preferred path, determining if the wavelength can be converted to a wavelength available on the preferred path; and (vi) if the wavelength can be converted to a wavelength available on the preferred path, converting the wavelength and routing the packet on the preferred path;

(vii) if the wavelength of the packet cannot be converted to a wavelength available on the preferred path at step (vi), determining if any wavelength is free on a loop back port;

(viii) if a wavelength is free on the loop back port, determining if wavelength conversion is needed;

(ix) if wavelength conversion is needed, converting the wavelength, sending the packet on the loop back port, and repeating steps (iii) through (vi); and (x) if wavelength conversion is not needed, sending the packet on the loop back port, and repeating steps (iii) through (vi).

15. An optical router as recited in claim 14, wherein said programming further carries out the operations of:

(xi) if no wavelength was available on the loop back port at step (vii), determining a second preferred path from the routing table;

(xii) determining if a wavelength is available on the second preferred path;

(xiii) routing the packet on the second preferred path if the wavelength is available on the second preferred path;

(xiv) if the wavelength was not available on the second preferred path, determining if the wavelength can be converted to a wavelength available on the second preferred path; and (xv) if the wavelength can be converted to a wavelength available on the second preferred path, converting the wavelength and routing the packet on the second preferred path.

16. A method for resolving switching conflicts in an optical router, comprising:

(a) receiving a data packet having an optical wavelength and a destination;

(b) determining a preferred path to the destination from a routing table;

(c) testing the packet to determine if the wavelength is available on the preferred path;

(d) routing the packet on the preferred path if the wavelength is available on the preferred path;

(e) if the wavelength was not available on the preferred path, determining if the wavelength can be converted to a wavelength available on the preferred path; and (f) if the wavelength can be converted to a wavelength available on the preferred path, converting the wavelength and routing the packet on the preferred path;

(g) if the wavelength of the packet cannot be converted to a wavelength available on the preferred path at step (f), determining if any wavelength is free on a loop back port;

(h) if a wavelength is free on the loop back port, determining if wavelength conversion is needed;

(i) if wavelength conversion is needed, converting the wavelength, sending the packet on the loop back port, and repeating steps (c) through (f); and (j) if wavelength conversion is not needed, sending the packet on the loop back port, and repeating steps (c) through (f);

wherein said optical router comprises (i) an optical wavelength router having an input and output;

(ii) an input optical wavelength converter stage having an input and an output, said converter stage being tunable; and (iii) an output optical wavelength converter stage having an input and an output;

(iv) wherein said output of said input wavelength converter stage is connected to said input of said wavelength router;

(v) wherein said input of said output wavelength converter stage is connected to said output of said wavelength router; and (vi) wherein tuning said input wavelength converter stage can achieve time, space or wavelength domain switching.

17. A method as recited in claim 16, further comprising:

(k) if no wavelength was available on a loop back port at step (g), determining a second preferred path from the routing table;

(l) determining if the wavelength is available on the second preferred path;

(m) routing the packet on the second preferred path if the wavelength is available on the second preferred path;

(n) if the wavelength was not available on the second preferred path, determining if the wavelength can be converted to a wavelength available on the second preferred path; and (o) if the wavelength can be converted to a wavelength available on the second preferred path, converting the wavelength and routing the packet on the second preferred path.

* * * * *